US011172215B2

(12) United States Patent
Rusanovskyy

(10) Patent No.: US 11,172,215 B2
(45) Date of Patent: Nov. 9, 2021

(54) QUANTIZATION ARTIFACT SUPPRESSION AND SIGNAL RECOVERY BY THE TRANSFORM DOMAIN FILTERING

(71) Applicant: QUALCOMM Incorporated, San Diego, CA (US)

(72) Inventor: Dmytro Rusanovskyy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/595,016

(22) Filed: Oct. 7, 2019

(65) Prior Publication Data

US 2020/0112736 A1 Apr. 9, 2020

Related U.S. Application Data

(60) Provisional application No. 62/742,847, filed on Oct. 8, 2018.

(51) Int. Cl.
*H04N 7/12* (2006.01)
*H04N 19/44* (2014.01)
*H04N 19/70* (2014.01)
*H04N 19/61* (2014.01)

(52) U.S. Cl.
CPC .......... *H04N 19/45* (2014.11); *H04N 19/619* (2014.11); *H04N 19/70* (2014.11)

(58) Field of Classification Search
CPC ...................................................... H04N 19/45
See application file for complete search history.

(56) References Cited

PUBLICATIONS

Chen C-Y., et al., "Description of Core Experiment 5 (CE5): Loop filtering", Joint Video Experts Team (JVET) of ITU-T SG 16 WP 3 and ISO/IEC JTC 1/SC 29/WG 11, JVET-O2025-v3, Jul. 3-12, 2019, 10 pages.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.
Ergen S., "ZigBee/IEEE 802.15.4 Summary", Sep. 10, 2004, 37 pp.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

(Continued)

*Primary Examiner* — Y Lee
(74) *Attorney, Agent, or Firm* — Shumaker & Sieffert, P.A.

(57) ABSTRACT

An apparatus for decoding video data includes memory and one or more processors implemented in circuitry. The one or more processors are configured to receive a bitstream including encoded video data, decode, from the bitstream, values for one or more syntax elements to generate a residual block for a current block, prediction information for the current block, and transform domain filtering information. The one or more processors are further configured to reconstruct the current block using the prediction information and the residual block to generate a reconstructed block. In response to determining that the transform domain filtering information indicates that transform domain filtering is enabled for the current block, the one or more processors are configured to perform transform domain filtering on the reconstructed block to generate a filtered block.

30 Claims, 14 Drawing Sheets

(56) References Cited

PUBLICATIONS

Ikonin (Huawei) S., et al., "CE14: Hadamard Transform Domain Filter (Test 3)", 12. JVET Meeting; Oct. 3, 2018-Oct. 12, 2018; MACAO; (The Joint Video Exploration Team of ISO/IEC JTC1/SC29/WG11 and ITU-T SG.16) No. JVET-L0326, Oct. 7, 2018 (Oct. 7, 2018), XP030195212, 14 Pages, Retrieved from the Internet: URL:http://phenix.int-evry.fr/jvet/doc_end_user/documents/12_Macao/wg11/JVET-L0326-v4.zip JVET-L326-v4.docx [retrieved on Oct. 7, 2018].
International Search Report and Written Opinion—PCT/US2019/055202—ISA/EPO—dated Dec. 16, 2019.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
Rusanovskyy D., et al., "Video Denoising Algorithm in Sliding 3D DCT domain", ACIVS 2005, Antwerp, Belgium, 8 pages.
Stepin (Huawei) V., et al., "CE2 related: Hadamard Transform Domain Filter", 11. JVET Meeting; Jul. 11, 2018-Jul. 18, 2018; Ljubljana; (The Joint Video Exploration Team of ISO/IEC JTC1/SC29/WG11 and ITU-T SG.16), No. JVET-K0068, Oct. 7, 2018 (Oct. 7, 2018), XP030193510, 5 Pages, Retrieved from the Internet: URL:http://phenix.int-evry.fr/jvet/doc_end_user/documents/11_Ljubljana/wg11/JVET-K0068-v4.zip JVET-K0068-v3.docx [retrieved on Aug. 1, 2018], pp. 1-3.
Sze V., et al., "High Efficiency Video Coding (HEVC): Algorithms and Architectures", Springer International Publishing, Jan. 1, 2014, 384 pages, XP55263413, ISBN: 978-3-319-06894-7.
Van Der Auwera G., et al., "Non-CE12 Subtest 5: Transform Dependent Deblocking Filter Parameter Adjustment in Slice Level", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG. 16 ); URL: http://wftp3.itu.int/av-arch/jctvc-site/,, No. JCTVC-G291, Nov. 9, 2011 (Nov. 9, 2011), XP030110275, 5 Pages, p. 2, lines 2-3.
Choi K., et al., "Text of ISO/IEC CD 23094-1, Essential Video Coding", Coding of Moving Pictures and Audio, Jul. 2019, Gothenburg, Sweden, ISO/IEC JTC1/SC29/WG11 N18568, ISO/IEC CD 23094-1, Jul. 2019, 292 Pages.

QUANTIZATION ARTIFACT SUPPRESSION AND SIGNAL RECOVERY BY THE TRANSFORM DOMAIN FILTERING

This application claims the benefit of U.S. Provisional Application No. 62/742,847 filed Oct. 8, 2018, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to a filtering process performed on video frames distorted by compression, blurring, etc., to potentially improve the objective and subjective qualities. One or more techniques described herein may be used in the design of the new video coding solutions, such as H.266, or extending any of the existing video codecs, such as H.265/High Efficiency Video Coding (HEVC), or be proposed as a promising coding tool to future video coding standards. It may also be used as a post-processing method on video frames outputted from either standard or proprietary codecs.

In one example, a method of decoding video data includes: receiving, by a video decoder implemented in circuitry, a bitstream including encoded video data; decoding, by the video decoder, from the bitstream, values for one or more syntax elements to generate a residual block for a current block, prediction information for the current block, and transform domain filtering information; reconstructing, by the video decoder, the current block using the prediction information and the residual block to generate a reconstructed block; and in response to determining that the transform domain filtering information indicates that transform domain filtering is enabled for the current block, performing, by the video decoder, transform domain filtering on the reconstructed block to generate a filtered block, wherein performing transform domain filtering comprises: generating a set of samples for a pixel of the reconstructed block; performing a transform on the set of samples for the pixel from a pixel domain to a frequency domain to generate spectrum components of reconstructed pixels; filtering the spectrum components of the reconstructed pixels to generate filtered spectrum components of the reconstructed pixels; and performing an inverse transform on the filtered spectrum components of the reconstructed pixels from the frequency domain to the pixel domain to generate a filtered value for the pixel.

In another example, an apparatus for decoding video data includes: memory configured to store encoded video data; and one or more processors implemented in circuitry and configured to: receive a bitstream including encoded video data; decode, from the bitstream, values for one or more syntax elements to generate a residual block for a current block, prediction information for the current block, and transform domain filtering information; reconstruct the current block using the prediction information and the residual block to generate a reconstructed block; and in response to determining that the transform domain filtering information indicates that transform domain filtering is enabled for the current block, perform transform domain filtering on the reconstructed block to generate a filtered block, wherein, to perform transform domain filtering, the one or more processors are configured to: generate a set of samples for a pixel of the reconstructed block; perform a transform on the set of samples for the pixel from a pixel domain to a frequency domain to generate spectrum components of reconstructed pixels; filter the spectrum components of the reconstructed pixels to generate filtered spectrum components of the reconstructed pixels; and perform an inverse transform on the filtered spectrum components of the reconstructed pixels from the frequency domain to the pixel domain to generate a filtered value for the pixel.

In another example, an apparatus for decoding video data includes: means for receiving a bitstream including encoded video data; means for decoding, from the bitstream, values for one or more syntax elements to generate a residual block for a current block, prediction information for the current block, and transform domain filtering information; means for reconstructing the current block using the prediction information and the residual block to generate a reconstructed block; and means for performing transform domain filtering on the reconstructed block to generate a filtered block in response to determining that the transform domain filtering information indicates that transform domain filtering is enabled for the current block, wherein means for performing transform domain filtering comprises: means for generating a set of samples for a pixel of the reconstructed block; means for performing a transform on the set of samples for the pixel from a pixel domain to a frequency domain to generate spectrum components of reconstructed pixels; means for filtering the spectrum components of the reconstructed pixels to generate filtered spectrum components of the reconstructed pixels; and means for performing an inverse transform on the filtered spectrum components of the reconstructed pixels from the frequency domain to the pixel domain to generate a filtered value for the pixel.

In one example, a non-transitory computer-readable storage medium stores instructions that, when executed cause one or more processors to: receive a bitstream including encoded video data; decode, from the bitstream, values for one or more syntax elements to generate a residual block for a current block, prediction information for the current block, and transform domain filtering information; reconstruct the current block using the prediction information and the residual block to generate a reconstructed block; and in response to determining that the transform domain filtering information indicates that transform domain filtering is enabled for the current block, perform transform domain filtering on the reconstructed block to generate a filtered block, wherein, to perform transform domain filtering, the one or more processors are configured to: generate a set of samples for a pixel of the reconstructed block; perform a transform on the set of samples for the pixel from a pixel domain to a frequency domain to generate spectrum components of reconstructed pixels; filter the spectrum components of the reconstructed pixels to generate filtered spectrum components of the reconstructed pixels; and perform an inverse transform on the filtered spectrum components of the reconstructed pixels from the frequency domain to the pixel domain to generate a filtered value for the pixel.

In another example, a method of encoding video data includes: reconstructing, by a video encoder implemented in circuitry, a current block using prediction information and a residual block to generate a reconstructed block; in response to determining that transform domain filtering is enabled for the current block: encoding, by the video encoder, a bitstream for the video data, the bitstream including syntax elements indicating the prediction information, the residual block, and transform domain filtering information that indicates transform domain filtering is enabled for the current block; and performing, by the video encoder, transform domain filtering on the reconstructed block to generate a filtered block, wherein performing transform domain filtering comprises: generating a set of samples for a pixel of the reconstructed block; performing a transform on the set of samples for the pixel from a pixel domain to a frequency domain to generate spectrum components of reconstructed pixels; filtering the spectrum components of the reconstructed pixels to generate a filtered spectrum components of the reconstructed pixels; and performing an inverse transform on the filtered spectrum components of the reconstructed pixels from the frequency domain to the pixel domain to generate a filtered value for the pixel.

In another example, an apparatus for encoding video data includes memory configured to store the video data; and one or more processors implemented in circuitry and configured to: reconstruct a current block using prediction information and a residual block to generate a reconstructed block; in response to determining that transform domain filtering is enabled for the current block: encode a bitstream for the video data, the bitstream including syntax elements indicating the prediction information, the residual block, and transform domain filtering information that indicates transform domain filtering is enabled for the current block; and perform transform domain filtering on the reconstructed block to generate a filtered block, wherein, to perform transform domain filtering, the one or more processors are configured to: generate a set of samples for a pixel of the reconstructed block; perform a transform on the set of samples for the pixel from a pixel domain to a frequency domain to generate spectrum components of reconstructed pixels; filter the spectrum components of the reconstructed pixels to generate a filtered spectrum components of the reconstructed pixels; and perform an inverse transform on the filtered spectrum components of the reconstructed pixels from the frequency domain to the pixel domain to generate a filtered value for the pixel.

In one example, an apparatus for decoding video data includes: means for reconstructing a current block using prediction information and a residual block to generate a reconstructed block; means for encoding a bitstream for the video data in response to determining that transform domain filtering is enabled for the current block, the bitstream including syntax elements indicating the prediction information, the residual block, and transform domain filtering information that indicates transform domain filtering is enabled for the current block; and means for performing transform domain filtering on the reconstructed block to generate a filtered block, wherein the means for performing transform domain filtering comprises: means for generating a set of samples for a pixel of the reconstructed block; means for performing a transform on the set of samples for the pixel from a pixel domain to a frequency domain to generate spectrum components of reconstructed pixels; means for filtering the spectrum components of the reconstructed pixels to generate a filtered spectrum components of the reconstructed pixels; and means for performing an inverse transform on the filtered spectrum components of the reconstructed pixels from the frequency domain to the pixel domain to generate a filtered value for the pixel.

In another example, a non-transitory computer-readable storage medium stores instructions that, when executed cause one or more processors to: reconstruct a current block using prediction information and a residual block to generate a reconstructed block; in response to determining that transform domain filtering is enabled for the current block: encode a bitstream for the video data, the bitstream including syntax elements indicating the prediction information, the residual block, and transform domain filtering information that indicates transform domain filtering is enabled for the current block; and perform transform domain filtering on the reconstructed block to generate a filtered block, wherein, to perform transform domain filtering, the one or more processors are configured to: generate a set of samples for a pixel of the reconstructed block; perform a transform on the set of samples for the pixel from a pixel domain to a frequency domain to generate spectrum components of reconstructed pixels; filter the spectrum components of the reconstructed pixels to generate a filtered spectrum components of the reconstructed pixels; and perform an inverse transform on the filtered spectrum components of the reconstructed pixels from the frequency domain to the pixel domain to generate a filtered value for the pixel.

The details of one or more examples are set forth in the accompanying drawings and the description below. Other features, objects, and advantages will be apparent from the description, drawings, and claims.

DETAILED DESCRIPTION

Quantization conducted on transform coefficients of a residual block during an encoding and decoding process may result in quantization artifacts introduced in a residual block of video data. Accordingly, reconstructing the current block using prediction information and the residual block may result in blocking artifacts, such as, for example, but not limited to, horizontal and vertical discontinuities being formed in a resulting reconstructed block that do not exist in an original video data. Such discontinuities may be observed as moving and flickering and are undesirable. Moreover, such blocking artifacts, may reduce an accuracy of a prediction of video data, which may result in lower computational efficiency, a larger bitstream, and/or a higher power consumption.

Techniques described herein apply denoising and/or noise suppression in the transform domain, for instance, by applying Hadamard transform filtering. Moreover, to further improve an accuracy for reproducing the original video data, techniques described herein may help to control transform-based filtering using values of the syntax elements signaled in the bitstream to indicate whether transform based filtering is enabled, disabled, or attenuated for a current block of video data. In this way, rather than applying transform-based filtering to all blocks of video data, a video coder (e.g., video encoder or video decoder) may apply transform-based filtering to reduce or remove blocking artifacts from blocks of video data that are likely to include blocking artifacts.

Figure 1:
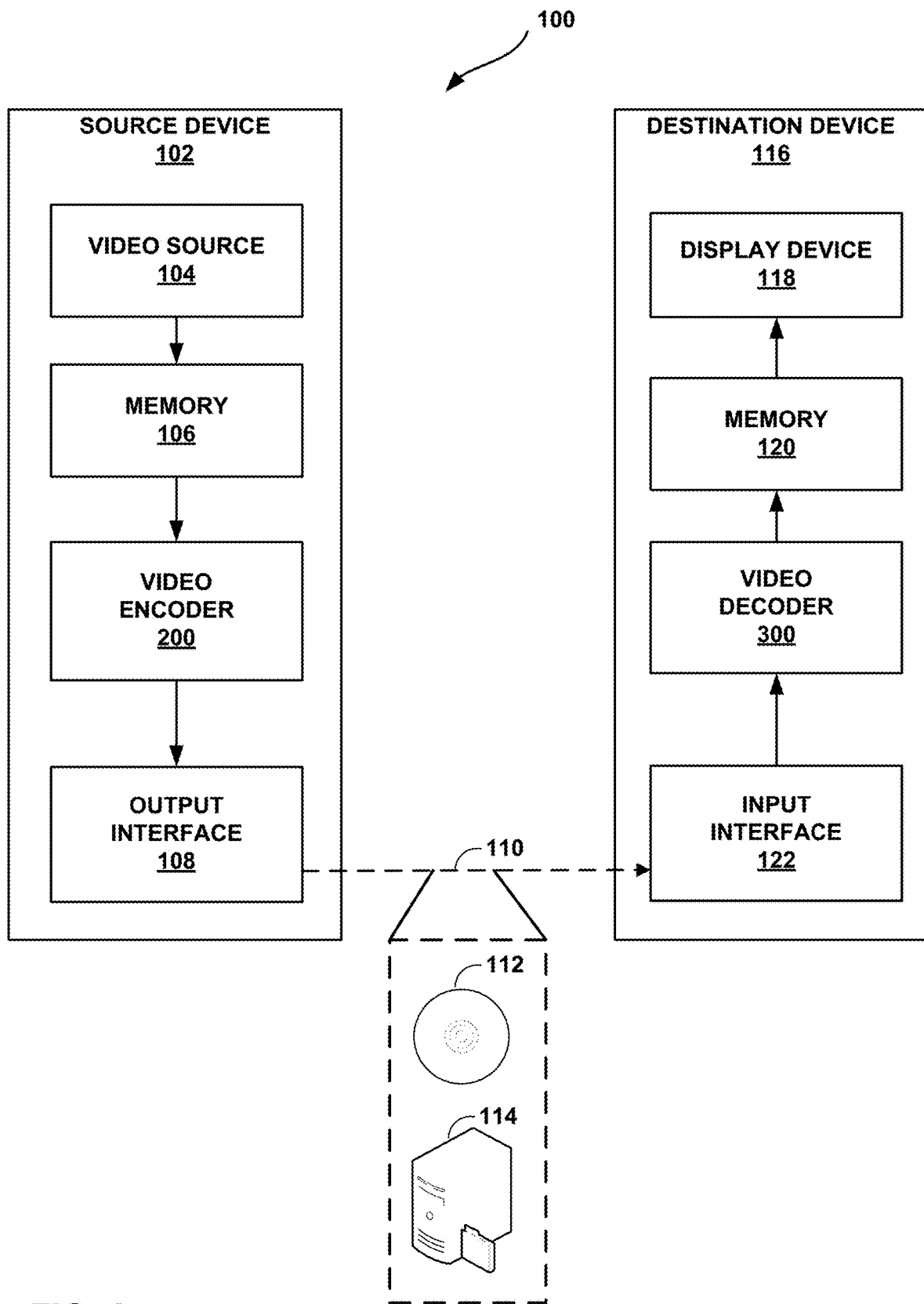
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110.

Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for quantization artifacts suppression and signal recovery by the transform domain filtering. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for quantization artifacts suppression and signal recovery by the transform domain filtering. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
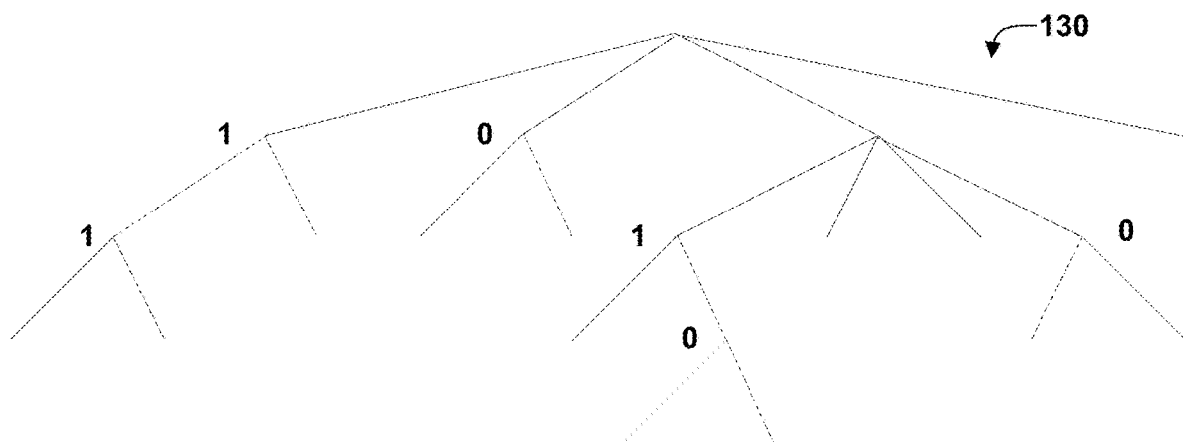
FIGS. 2A and 2B are conceptual diagrams illustrating an example quadtree binary tree (QTBT) structure, and a corresponding coding tree unit (CTU).
Figure 2B:
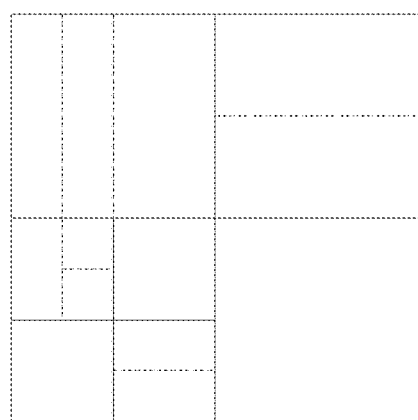

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
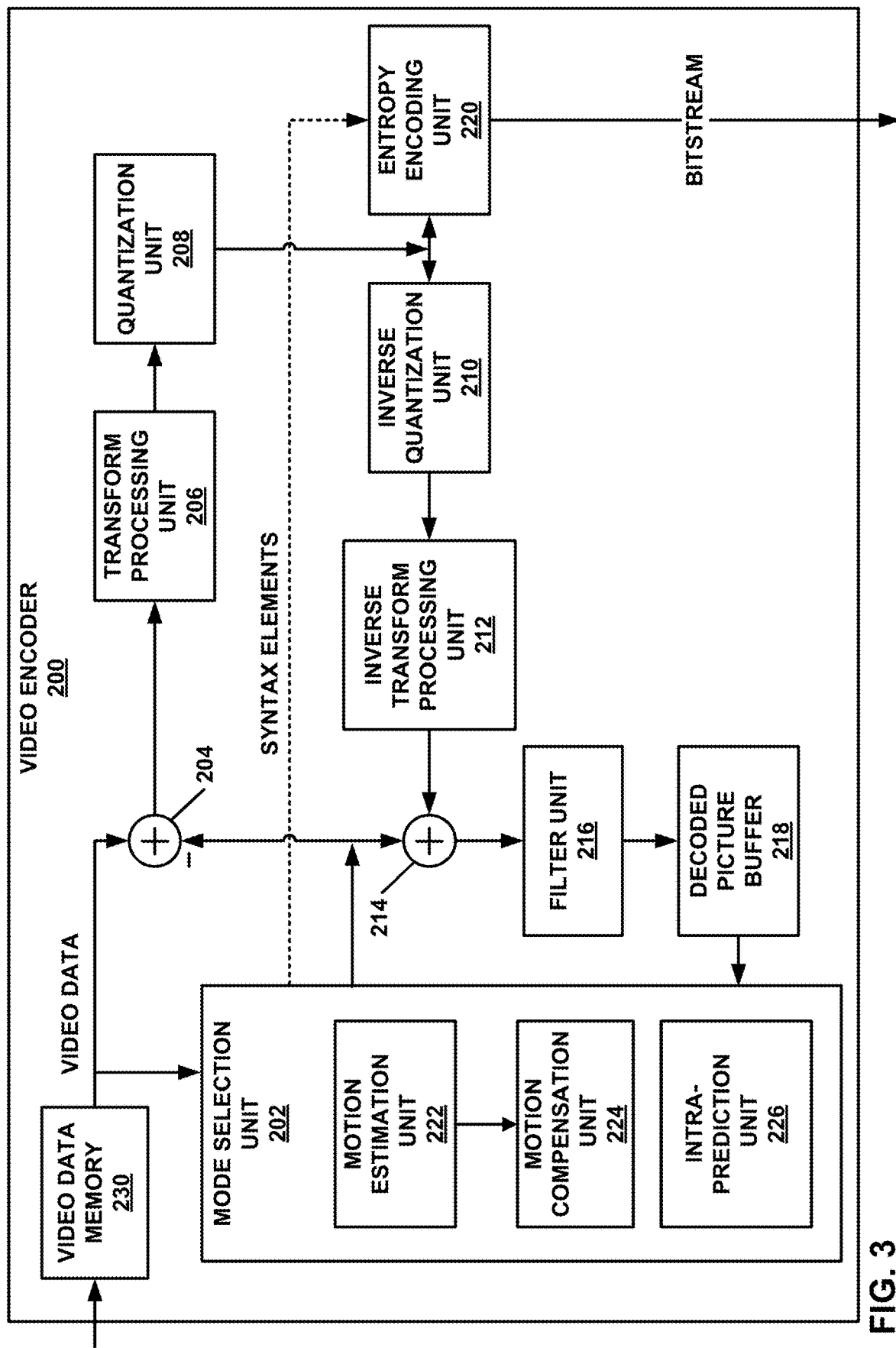
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 210 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block. In some examples, mode selection unit 202 may determine whether transform domain filtering is enabled, disabled, or attenuated (e.g., a smaller compacting of coefficients than enabled) for a current block. Mode selection unit 202 may output one or more syntax elements indicating that transform domain filtering is enabled, disabled, or attenuated for a current block, which may be encoded by entropy encoding unit 220.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block. Thus, Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. For example, filter unit 216 may be configured to determine first transform function values for a reconstructed block using a LUT, interpolate the first transform function values to generate second transform function values, and filter the reconstructed block using the second transform function value. For example, filter unit 216 may be configured to perform transform domain filtering as described further herein (see FIGS. 5-8 and 11-14).

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded. In some examples, entropy encoding unit 220 may entropy encode one or more syntax element for transform domain filtering information that indicate, for example, whether transform domain filtering is enabled, disabled, of attenuated.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

Reconstruction unit 214 may be configured to reconstruct a current block using prediction information and a residual block to generate a reconstructed block. In response to determining that transform domain filtering is enabled for the current block, entropy encoding unit 220 may be configured to encode a bitstream for the video data, the bitstream including syntax elements indicating the prediction information, the residual block, and transform domain filtering information that indicates transform domain filtering is enabled for the current block. In response to determining that transform domain filtering is enabled for the current block, filter unit 216 may be configured to perform transform domain filtering on the reconstructed block to generate a filtered block, wherein, to perform transform domain filtering, filter unit 216 is configured to: generate a set of samples for a pixel of the reconstructed block, perform a transform on the set of samples for the pixel from a pixel domain to a frequency domain to generate spectrum components of reconstructed pixels, filter the spectrum components of the reconstructed pixels to generate a filtered spectrum components of the reconstructed pixels, and perform an inverse transform on the filtered spectrum components of the reconstructed pixels from the frequency domain to the pixel domain to generate a filtered value for the pixel.

Figure 4:
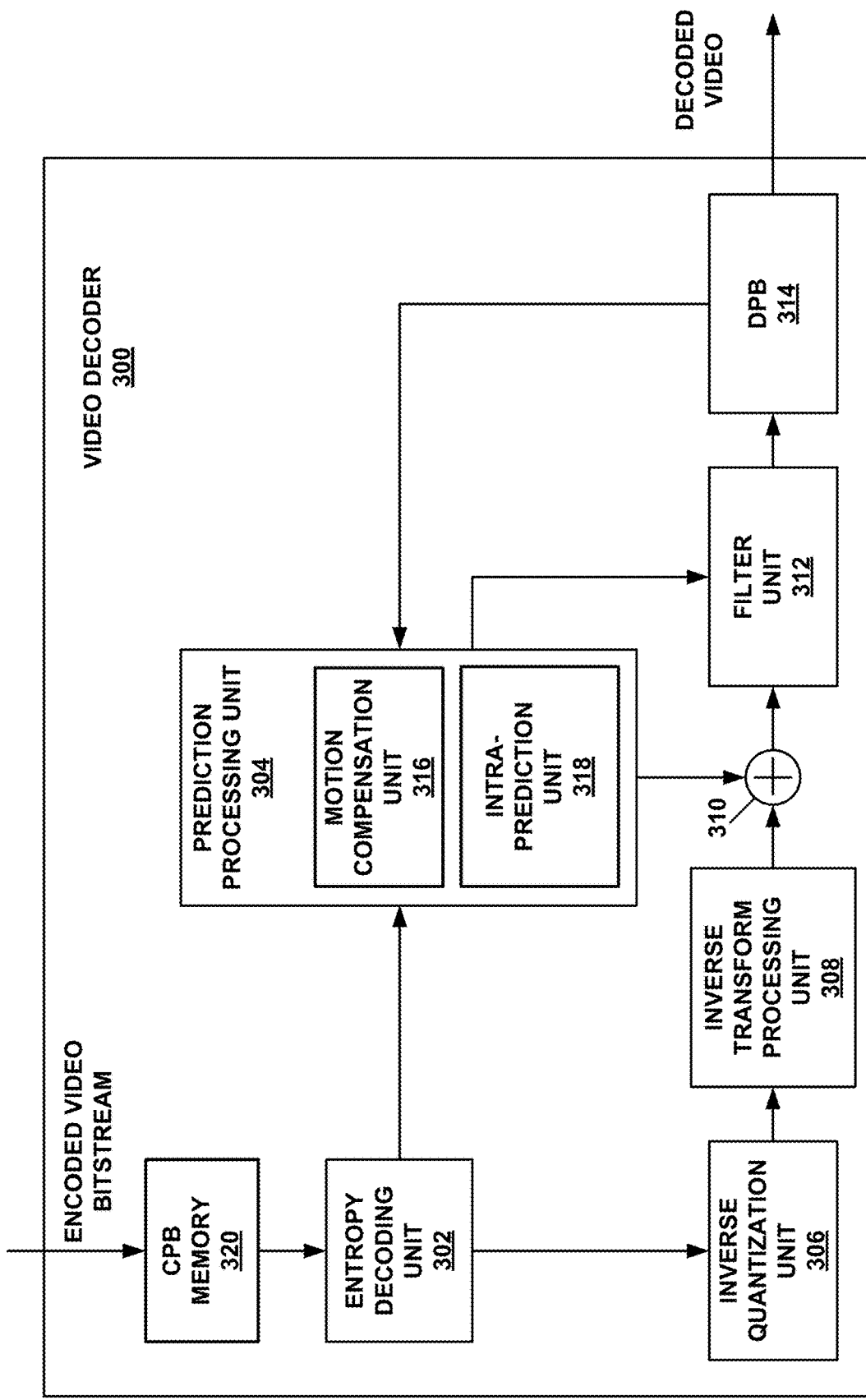
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 318), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). In some examples, entropy decoding unit 302 may entropy decode one or more syntax elements for transform domain filtering information that indicate, for example, whether transform domain filtering is enabled, disabled, of attenuated. Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3). For example, prediction processing unit 304 may receive values for one or more syntax elements indicating that transform domain filtering is enabled, disabled, or attenuated for a current block, which may be decoded by entropy decoding unit 302. In this example, prediction processing unit 304 may determine whether transform domain filtering is enabled, disabled, or attenuated for a current block based on the values for one or more syntax elements indicating that transform domain filtering is enabled, disabled, or attenuated for a current block.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. For example, filter unit 312 may be configured to determine first transform function values for a reconstructed block using a LUT, interpolate the first transform function values to generate second transform function values, and filter the reconstructed block using the second transform function value. Filter unit 312 may be configured to perform transform domain filtering as described further herein (see FIGS. 5-8 and 11-14).

In some examples, entropy decoding unit 302 may entropy decode one or more syntax element for transform domain filtering information that indicate, for example, whether transform domain filtering is enabled, disabled, of attenuated. Filter unit 312 may perform one or more filter operations on reconstructed blocks based on the transform domain filtering. For example, filter unit 312 may perform transform domain filtering (e.g., Hadamard transform filtering) in response to entropy decoding unit 302 entropy decoding one or more syntax element for transform domain filtering information that indicate that transform domain filtering is enabled.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to receive a bitstream including encoded video data, decode, from the bitstream, values for one or more syntax elements to generate a residual block for a current block, prediction information for the current block, and transform domain filtering information and reconstruct the current block using the prediction information and the residual block to generate a reconstructed block. In response to determining that the transform domain filtering information indicates that transform domain filtering is enabled for the current block, the one or more processing units are configured to perform transform domain filtering on the reconstructed block to generate a filtered block. In this example, to perform transform domain filtering, the one or more processors are configured to: generate a set of samples for a pixel of the reconstructed block, perform a transform on the set of samples for the pixel from a pixel domain to a frequency domain to generate spectrum components of reconstructed pixels and filter the spectrum components of the reconstructed pixels to generate filtered spectrum components of the reconstructed pixels. In this example, to perform transform domain filtering, the one or more processors are further configured to: perform an inverse transform on the filtered spectrum components of the reconstructed pixels from the frequency domain to the pixel domain to generate a filtered value for the pixel.

Figure 5:
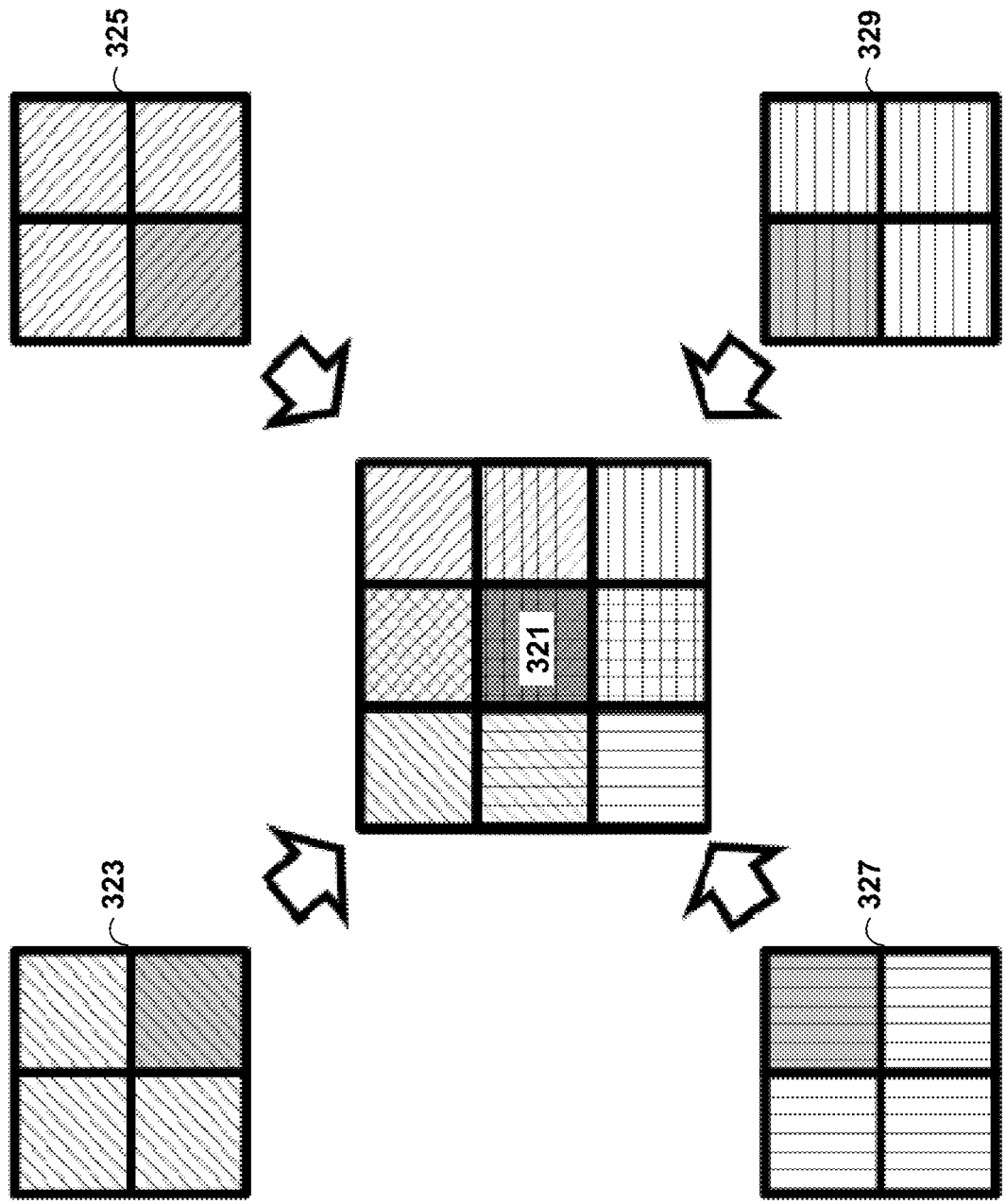
FIG. 5 is a conceptual diagram illustrating an example filtering process.

FIG. 5 is a conceptual diagram illustrating an example filtering process. Quantization conducted on transform coefficients of the coded block or on transform coefficients of residual block may result in quantization artifacts introduced to the block of data.

Blocking artifacts, one of such artifacts, the horizontal and vertical discontinuities that do not exist in the original picture (note that a picture can a still image or a frame from a video sequence), may be caused by moderate to high compression. These artifacts in flat areas look like "tiling", because these artifacts are not masked by highly contrasted content. Furthermore, the blocking artifacts in a playing video may be observed as "moving and flickering", because the discontinuities are located differently in successive frames.

One source of blocking artifacts is the block-based transform coding, including transform and quantization, on intra and inter prediction errors. Coarse quantization of the transform coefficients can cause visually disturbing discontinuities at the block boundaries. Motion compensated prediction is another source of blocking artifacts in videos. Motion compensated blocks may be generated by copying interpolated pixel data from different locations of possibly different reference frames. Because there is almost never a perfect fit for these data, discontinuities on the boundaries of the copied blocks of data typically arise.

Quantization noise introduced to the signal by scalar quantization of transform coefficients may result in introducing quantization noise to the reconstructed signal. To suppress this noise and recover the original signal, various filter designs have been proposed. One example of such filter designs is deblocking filter. Another example of such filtering designs is filtering in a transform domain to block artifact suppression, such as, for example, but not limited to, filtering in Sliding Window 3D DCT algorithm (SW-3DDCT) techniques for Gaussian noise suppression. Yet another example of transform domain filtering was a Hadamard transform filtering proposed for video coding. A brief description of Hadamard transform filtering is provided below.

In the example of FIG. 5, video encoder 200 and/or video decoder 300 may be configured to generate a first filtered value for pixel 321 using a first set of samples 323 arranged within a 2×2 window positioned for a top-left group of samples that includes pixel 321. In this example, video encoder 200 and/or video decoder 300 may be configured to generate a second filtered value for pixel 321 using a second set of samples 325 arranged within the 2×2 window positioned for a top-right group of samples that includes pixel 321. Video encoder 200 and/or video decoder 300 may be configured to generate a third filtered value for pixel 321 using a third set of samples 327 arranged within the 2×2 window positioned for a bottom-left group of samples that includes pixel 321. Further, video encoder 200 and/or video decoder 300 may be configured to generate a fourth filtered value for pixel 321 using a fourth set of samples 329 arranged within the 2×2 window positioned for a bottom-right group of samples that includes pixel 321. Video encoder 200 or video decoder 300 may generate an averaged value for pixel 321 using the first filtered value, the second filtered value, third filtered value, and the fourth filtered value. In this way, Hadamard transform filtering may help to reduce blocking artifacts and/or quantization noise.

In Hadamard transform filtering, video encoder 200 and/or video decoder 300 may apply the filter to reconstructed blocks with non-zero transform coefficients. Video encoder 200 and/or video decoder 300 may perform the filter on decoded samples right after block reconstruction. For example, video decoder 300 may be configured to receive a bitstream including encoded video data and decode, from a bitstream, values for one or more syntax elements to generate a residual block for a current block, prediction information for the current block, and transform domain filtering information. In this example, video decoder 300 may be configured to reconstruct the current block using the prediction information and the residual block to generate a reconstructed block. In some examples, video encoder 200 may be configured to reconstruct a current block using prediction information and a residual block to generate a reconstructed block. In this example, video encoder 200 may be configured to encode a bitstream for the video data, the bitstream including syntax elements indicating the prediction information, the residual block, and transform domain filtering information that indicates transform domain filtering is enabled for the current block. Video encoder 200 and/or video decoder 300 may use the filtered result both for output as well as for spatial and temporal prediction. The filter may have a same implementation both for intra and inter CU filtering.

For example, for each pixel from a reconstructed block, pixel processing may include one or more of the following steps to perform transform domain filtering on reconstructed blocks. In a first step, video encoder 200 and/or video decoder 300 assembles samples of local neighborhood size of 2×2 with current pixel included in the 2×2 windows. For example, video encoder 200 and/or video decoder 300 may be configured to generate a set of samples for a pixel of the reconstructed block. Video encoder 200 and/or video decoder 300 may conduct sample assembly according to a specified pattern.

In a second step, video encoder 200 and/or video decoder 300 conducts to the assembly of four samples a 4 point Hadamard transform. In a third step, video encoder 200 and/or video decoder 300 conducts transform domain filtering by non-uniform thresholding and filter coefficient scaling, $$F(i, \sigma) = \frac{R(i)^2}{R(i)^2 + m*\sigma^2} * R(i) \quad \text{EQUATION 1}$$

wherein (i) is index of spectrum component in Hadamard spectrum, R(i) is spectrum components of reconstructed pixels corresponding to index, m=4 is normalization constant equal to number of spectrum components, σ is filtering parameter deriving from codec quantization parameter QP using following equation:

$$\sigma = 2.64 * 2^{(0.1296*(QP-11))} \quad \text{EQUATION 2}$$

Said differently, for example, video encoder 200 and/or video decoder 300 may perform a transform on the set of samples for the pixel from a pixel domain to a frequency domain to generate spectrum components of reconstructed pixels and filter the spectrum components of the reconstructed pixels to generate a filtered spectrum components of the reconstructed pixels.

The first spectrum component corresponding to DC value may be bypassed without filtering. In some examples, video encoder 200 and/or video decoder 300 may perform an inverse 4 point Hadamard transform of filtered spectrum. In some examples, after performing a filtering step, video encoder 200 and/or video decoder 300 may place the filtered pixels to original positions into an accumulation buffer. In some examples, after completing filtering of pixels, video encoder 200 and/or video decoder 300 may normalize the accumulated values by number of processing windows 2×2 used for each pixel filtering. The filtering process is schematically presented on FIG. 6.

Figure 6:
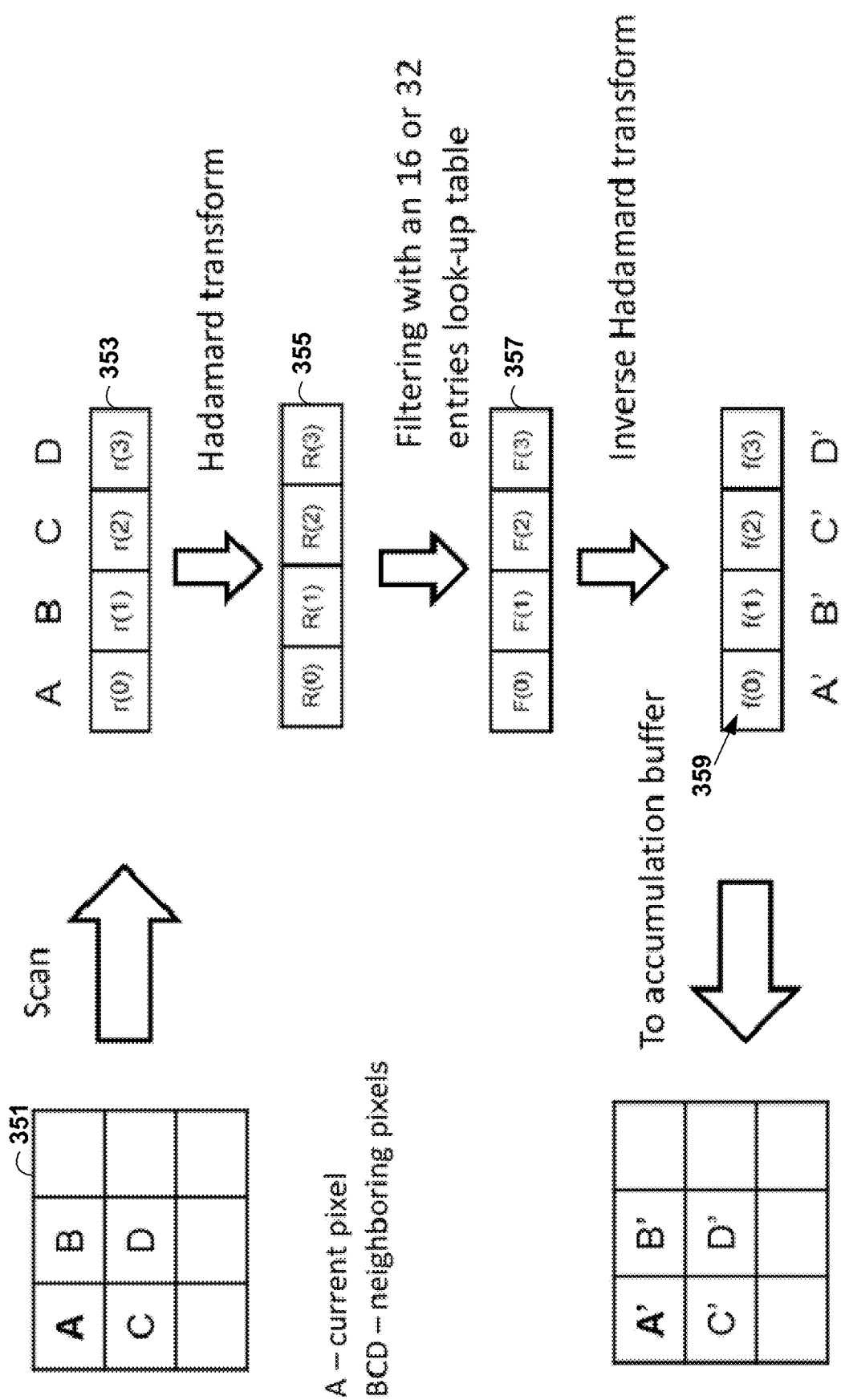
FIG. 6 is a conceptual diagram illustrating an example equivalent filter shape.

FIG. 6 is a conceptual diagram illustrating an example equivalent filter shape. An equivalent filter shape is a 3×3 block of pixels 351, as depicted in FIG. 6. The transform domain filtering process specified in Equation 1 introduces a multiplication of spectrum component R(i) on a scaling coefficient which is always less than 1. To exclude multiplication, a LUT based transfer function may be used as shown in equation 3, below:

$$F(i, \sigma) = \begin{cases} R(i), & \text{Abs}(R(i)) \geq THR \\ LUT(R(i), \sigma), & R(i) > 0 \\ -LUT(-R(i), \sigma), & R(i) \leq 0 \end{cases} \quad \text{EQUATION 3}$$

In equation 3, $$LUT(R(i), \sigma) = \frac{R(i)^3}{R(i)^2 + m*\sigma^2}.$$

wherein (i) is index of spectrum component in Hadamard spectrum, a is defined in equation 2, abs( ) is a function that returns an absolute value, R(i) is spectrum components of reconstructed pixels corresponding to index, and m=4 is normalization constant equal to number of spectrum components.

Said differently, for example, video encoder 200 and/or video decoder 300 may assemble (e.g., scan, generate, etc.) a set of samples 353 for a pixel (e.g., A) of the reconstructed block, perform a transform on the set of samples for the pixel from a pixel domain to a frequency domain to generate spectrum components 355 of reconstructed pixels and filter the spectrum components 355 of the reconstructed pixels to generate a filtered spectrum components 357 of the reconstructed pixels. In this example, the transform is a Hadamard transform, however, in other examples, other transforms may be used.

Video encoder 200 and/or video decoder 300 may then apply an inverse Hadamard transform to the filtered spectrum components of the reconstructed pixels. In this example, in other examples, other inverse transforms may be used. For example, video encoder 200 and/or video decoder 300 may perform an inverse transform on filtered spectrum components 357 of the reconstructed pixels from the frequency domain to the pixel domain to generate a filtered value 359 for the pixel (e.g., A').

Video encoder 200 and/or video decoder 300 may repeat this process for all 2×2 areas containing the sample and may average the result. For example, video encoder 200 and/or video decoder 300 may be configured to generate a first filtered value for the pixel using a first set of samples 323 for a pixel, generate a second filtered value for the pixel using a second set of samples 325 for the pixel, generate a third filtered value for the pixel using a third set of samples 327 for the pixel, and generate a fourth filtered value for the pixel using a fourth set of samples 329 for the pixel, and average the first filtered value, the second filtered value, the third filtered value, and the fourth filtered value to generate an averaged value for the pixel.

For sample x, video encoder 200 and/or video decoder 300 may process four blocks 2×2 via spectrum X1 for top-left group of samples, X2 for top-right, X3 for bottom-left and X4 for bottom-right group of samples. The output value produced by the inverse Hadamard transform from scaled coefficients form an estimate xi, output value y is produced by averaging for estimates:

$$y=(\text{invT}(\text{TF}(X1))+\text{invT}(\text{TF}(X2))+\text{invT}(\text{TF}(X3))+\text{invT}(\text{TF}(X4)))/4 \quad \text{EQUATION 4}$$

where Xi are transform coefficients, TF is a transfer function, invT is process of inverse transformation.

That is, for example, video encoder 200 and/or video decoder 300 may be configured to repeat the process for each set of samples for the pixel. For instance, video encoder 200 and/or video decoder 300 may be configured to generate a second set of samples for the pixel. Video encoder 200 and/or video decoder 300 may be configured to perform the transform on the second set of samples for the pixel from the pixel domain to the frequency domain to generate second spectrum components of the reconstructed pixels. In this example, video encoder 200 and/or video decoder 300 may be configured to filter the second spectrum components of the reconstructed pixels to generate second filtered spectrum components of the reconstructed pixels. Video encoder 200 and/or video decoder 300 may be configured to perform the inverse transform on the second filtered spectrum components of the reconstructed pixels from the frequency domain to the pixel domain to generate a second filtered value for the pixel.

Video encoder 200 and/or video decoder 300 may use a look-up table to approximate the transfer function in Equation 3 (or 2). In some examples, video encoder 200 and/or video decoder 300 may only tabulate positive values, and for values larger than 127, video encoder 200 and/or video decoder 300 may use the approximation F(x)=x instead. Furthermore, in some examples, not every value between 0 and 127 is tabulated. Instead, video encoder 200 and/or video decoder 300 may use subsampling, so that a total of N (32 or 16) values are used.

Figure 7:
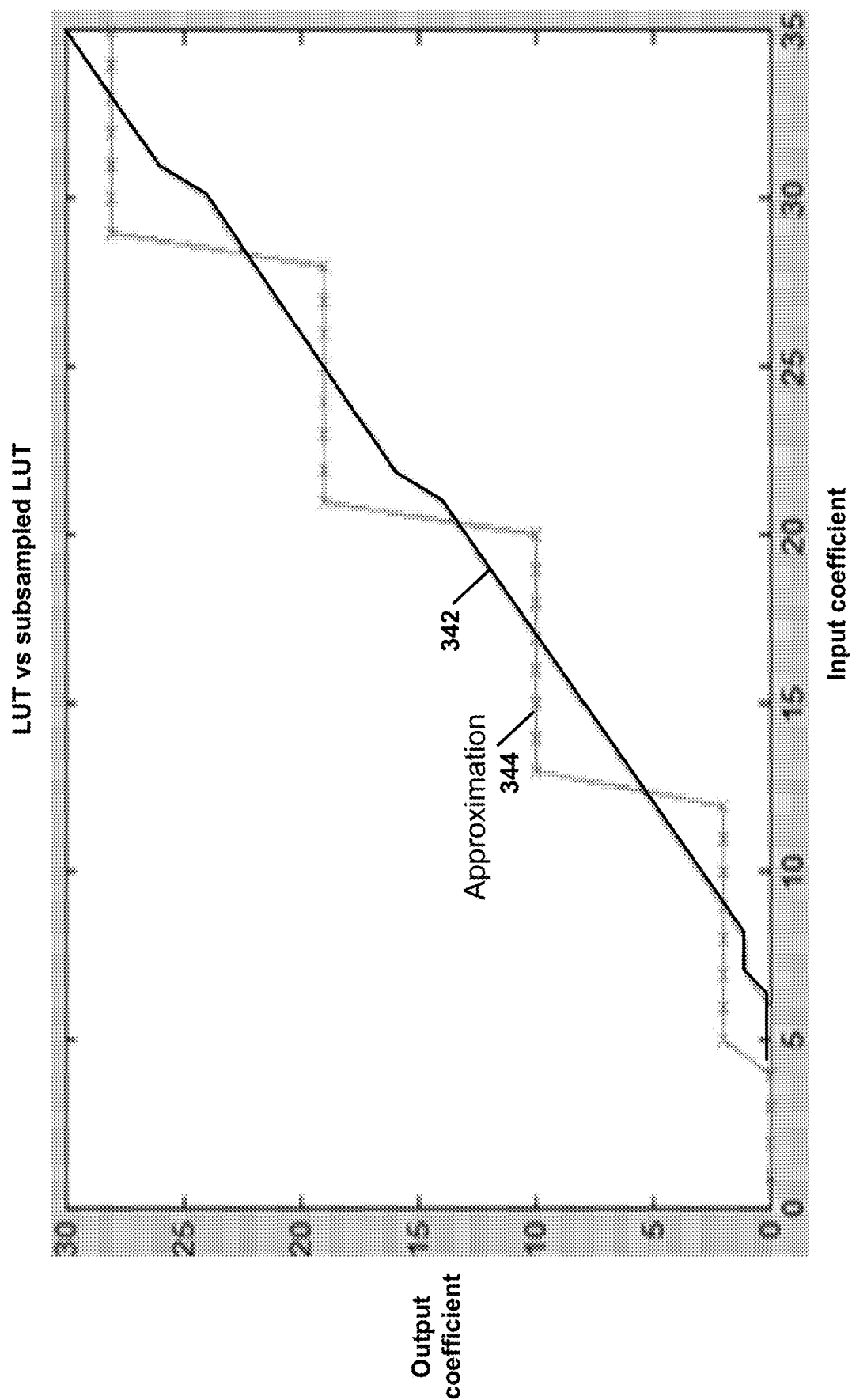
FIG. 7 is a conceptual diagram illustrating an example transfer function using a subsampled look-up-table (LUT).

FIG. 7 is a conceptual diagram illustrating an example transfer function using a subsampled look-up-table (LUT). Independent LUT is constructed for each QP value, and subsampled to reduce the utilized storage, see visualization in FIG. 7, where curve 702 shows intended LUT representing transfer function of Equation 3 (or 2) and line 344 shows its approximation. FIG. 7 illustrates an original LUT at line 342 compared to LUT of 14.3b, lowest qp range 18-23. In some examples, video encoder 200 and/or video decoder 300 may be configured to select and/or derive a LUT based on the QP value.

Thus, for qp-range (18-23) as an example, as visualized in FIG. 7, the transfer function with using the subsampled LUT of 14.3 (line 344) has more discontinuities compared to a non-subsampled version (line 342). This approximation includes discontinuities at regular intervals.

These discontinuities will cause quantization effects in the filtered output. Consider the following slow brightness ramp of slope −5.5 for a block:

| 250 | 245 | 239 | 234 | 228 | 223 | 217 | 212 | ... |
| 250 | 245 | 239 | 234 | 228 | 223 | 217 | 212 | |
| 250 | 245 | 239 | 234 | 228 | 223 | 217 | 212 | |
| ... | | | | | | | | |

After applying a Hadamard transform, feeding the AC coefficients through the transfer function (LUT) and applying an inverse Hadamard transform, this has become:

| 249 | 246 | 238 | 235 | 227 | 224 | 216 | 213 | ... |
| 249 | 246 | 238 | 235 | 227 | 224 | 216 | 213 | |
| 249 | 246 | 238 | 235 | 227 | 224 | 216 | 213 | |
| ... | | | | | | | | |

Figure 8:
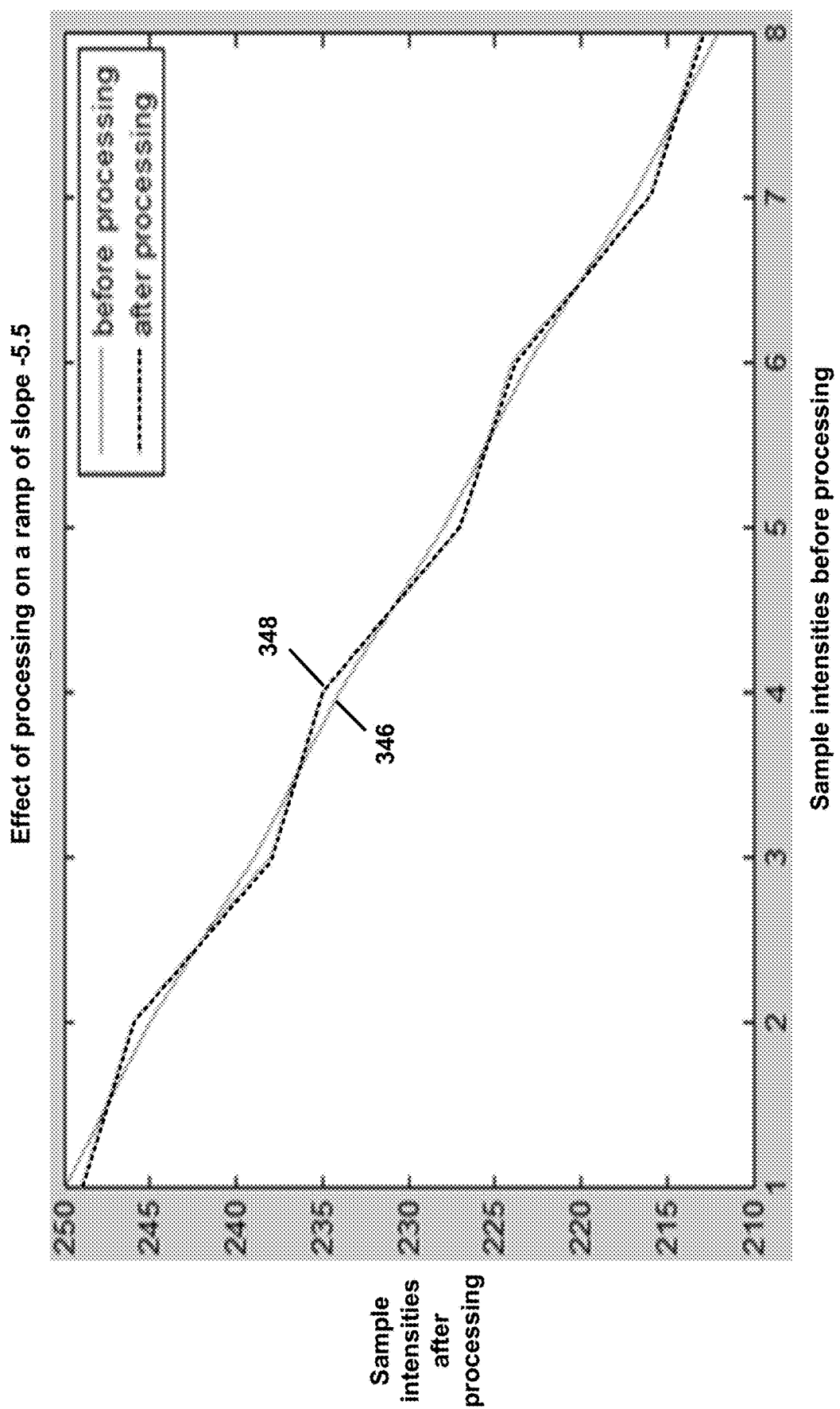
FIG. 8 is a conceptual diagram illustrating an example effect of processing a brightness ramp of slope −5.5.

FIG. 8 is a conceptual diagram illustrating an example effect of processing a brightness ramp of slope −5.5. FIG. 8 plots the intensities of the above scan line before (line 346) and after (line 348) processing. As can be seen in FIG. 8, the processing causes the brightness ramp to become wobblier (line 348).

The approximation of the transfer function of Equation 3 (or 2) may result in regular discontinuities. Presence of these discontinuities can potentially lead to distortions or banding artifacts introduce in reconstructed image.

Another aspect of the transform domain design is that filtered estimates produced for overlapped window size 2×2 is averaged taking all estimates equally. Thus, no prior knowledge about error distribution within the block may be used when applying transform filtering, such as, for example, Hadamard transform filtering.

A third aspect of the transform domain design is that all samples of the block undergo filtering, thus, prior knowledge about error distribution may not be used when applying transform filtering, such as, for example, Hadamard transform filtering.

This disclosure proposes several techniques to improve performance of the Hadamard transform filtering proposed for post-reconstruction application within video codec. Techniques of this disclosure may be used separately or in combination.

In a first technique, video encoder 200 and/or video decoder 300 may be configured to use the reduced size transfer function produced by using equation 3.

In a second technique, video encoder 200 and/or video decoder 300 may derive the actual transform function value TF(x) for input value x, through the derivation of the TF values coarsely describing the transform function. In some examples, video encoder 200 and/or video decoder 300 may utilize a derivation process such as, for example, linear interpolation, e.g. by piece wise linear interpolation. In some examples, video encoder 200 and/or video decoder 300 may implement the linear interpolation using y=x*a+b. In some examples, TF(x)=TF(0)+x*dTF, where TF(0) is a starting point of the transform function, x is input value, and dTF is a linear function parameter describing the slope of the TF function. Alternatively, or additionally, video encoder 200 and/or video decoder 300 may implement linear interpolating through binary shifts:

$$T(x)=TF(0)+x<<\text{numShifts}$$

In the equation above, numShift represents the multiplier, e.g., dTF=1<<numShift;

Alternatively, or additionally, video encoder 200 and/or video decoder 300 may implement this interpolating through LUT fetching:

$$TF(x)=TF(0)+LUT1(x>>\text{numShifts})+LUT2(x-1<<\text{numShifts})$$

In the equation above, LUT represent a trand of the transfer function TF at coarse representation, and LUT2 provides local refinement values for transform function TF(x).

In some examples, video encoder 200 may provide parameters of linear approximation of the TF(x) to the decoder (e.g., video decoder 300) as side information. In some examples, video decoder 300 may derive the parameters of the linear approximation of the TF(x) from syntax elements signaled in the bitstream by video encoder 200. In some examples, video encoder 200 and video decoder 300 may derive the parameters of the linear approximation of the TF(x) from a block size, a coding mode, and a transform type and/or transform coefficient values for a given block.

In some examples, parameters of linear approximation of the TF(x) to the decoder (e.g., video decoder 300) can be made adaptive to a slice, tiles, tile group of tiles or CU.

In some examples, video encoder 200 may provide several parameters describing the parameters of the linear approximation of the TF(x) to decoder (e.g., video decoder 300) either as a side information or through the coded bitstream. Some of these parameters of the linear approximation of the TF(x) can be made transparent, thus omitting filtering. Selection of the proper TF from a provided set can be made by deriving an index value specifying a filter ID from syntax elements of the bitstream or from parameters of coded video signal.

In a third technique, estimates contributing to the output value y in Equation 4 can be taken with a certain weight which is derived either from side information provided to video decoder 300, or from parameters of a current block (i.e., a currently processed block). Example parameters of the current block may include a block size of the current block, a spatial location of a sample x within the current block, coding modes of the current block or syntax elements derived from the bitstream.

Video encoder 200 and/or video decoder 300 may utilize a weight derivation process, such as, for example, linear interpolation, e.g. by piece wise.

$$y=(a1*\text{invT}(TF(X1))+a2*\text{invT}(TF(X2))+a3*\text{invT}(TF(X3))+a4*\text{invT}(TF(X4)))>>2 \quad \text{EQUATION 5}$$

Said differently, for example, video encoder 200 may be configured to determine a first weight value (e.g., a1), a second weight value (e.g., a2), a third weight value (e.g., a3), and a fourth weight value (e.g., a4) and encode side information that includes values for one or more syntax elements that indicate the first weight value, the second weight value, the third weight value, and the fourth weight value. Similarly, video decoder 300 may be configured to decode values for one or more syntax elements to generate side information and determine a first weight value, a second weight value, a third weight value, and a fourth weight value using the side information.

In some examples, video encoder 200 and/or video decoder 300 may be configured to derive the first weight value, the second weight value, the third weight value, and the fourth weight value based on one or more of a block size for the current block, a spatial location of each sample of the first set of samples within the current block, and a coding mode for the current block.

To perform transform domain filtering, video encoder 200 and/or video decoder 300 may be configured to generate a first weighted value for the pixel using the first weight value and a first filtered value generated using a first set of samples for the pixel. For instance, video encoder 200 and/or video decoder 300 may be configured to generate a first weighted value (a1*invT(TF(X1)) by multiplying the first weight value (a1) by the first filtered value, which is generated by calculating invT(TF(X1). Video encoder 200 and/or video decoder 300 may generate a second weighted value for the pixel using the second weight value and a second filtered value generated using a second set of samples for the pixel, generate a third weighted value for the pixel using third weight value and a third filtered value generated using a third set of samples for the pixel, generate a fourth weighted value for the pixel using the fourth weight value and a fourth filtered value generated using a fourth set of samples for the pixel.

In this example, video encoder 200 and/or video decoder 300 may average the first weighted value, the second weighted value, the third weighted value, and the fourth weighted value to generate an averaged value for the pixel. For example, video encoder 200 and/or video decoder 300 may be configured to generate a filtered block to indicate the averaged value for the pixel. For instance, video encoder 200 and/or video decoder 300 may be configured to generate a first weighted value by calculating a1*invT(TF(X1), the second weighted value by calculating a2*invT(TF(X2), the third weighted value by calculating a3*invT(TF(X3), and the fourth weighted value by calculating a4*invT(TF(X4). Video encoder 200 and/or video decoder 300 may sum the first weighted value, the second weighted value, the third weighted value, and the fourth weighted value and divide the result by four by shifting the result twice (e.g., >>2) to generate an averaged value for the pixel.

In a fourth technique, video encoder 200 and/or video decoder 300 may form groups of samples X1-X4 by a rectangular window, actual properties of the rectangular windows (e.g. sizes in each direction) can depend on current block properties, such as size/coding mode or transform properties. For example, video encoder 200 and/or video decoder 300 may determine a size of a rectangular window for a set of samples (e.g., X1) for a pixel based on one or more of a size of a current block and/or a coding mode for the current block.

In a fifth technique, within a current block, not every sample of the current block can be processed. For example, a transform-based filter can be limited to the samples laying in a boundary region (e.g., outer edges of a current block) of processed block. Thus, video encoder 200 and/or video decoder 300 may apply no filtering to samples in the center region of the processed block.

Said differently, for example, video encoder 200 and/or video decoder 300 may be configured to determine whether a pixel is within a boundary region of a current block. In response to determining that the pixel is within the boundary region of the current block, video encoder 200 and/or video decoder 300 may be configured to perform a transform on a set of samples for the pixel from the pixel domain to the frequency domain to generate spectrum components of the reconstructed pixels. In this example, video encoder 200 and/or video decoder 300 may be configured to filter the spectrum components of the reconstructed pixels to generate filtered spectrum components of the reconstructed pixels. Video encoder 200 and/or video decoder 300 may be configured to perform an inverse transform on the filtered spectrum components of the reconstructed pixels from the frequency domain to the pixel domain to generate a filtered value for the pixel.

In some examples, video encoder 200 and/or video decoder 300 may be configured to determine that a pixel is not within the boundary region of the current block and, in response to determine that the pixel is not within the boundary region of the current block, refrain from performing transform domain filtering on the pixel.

In a sixth technique, control of transform-based filtering can be enabled, disabled, or attenuated (e.g., a smaller compacting of coefficients than enabled) by syntax elements signalled in the bitstream either on a CU level, a CTU level, a TU level, a slice level, a picture level, or a sequence level. The syntax elements to enable, disable, or attenuate transform-based filtering may be signaled either in a form of flag elements or identifier elements interleaved with other data or in a form of an applicability map. Alternatively, certain decision-making logic can be deployed to reach a conclusion on the applicability of transform-based filtering. For instance, video encoder 200 and/or video decoder 300 may be configured to determine whether transform-based filtering is enabled, disabled, or attenuated based on a size of a current block, a prediction time, or other information.

For example, in response to determining that the transform domain filtering information, which may be decoded from values of one or more syntax elements, indicates that transform domain filtering is enabled for the current block, video decoder 300 may perform transform domain filtering on a reconstructed block to generate a filtered block. Similarly, in one example, in response to determining that transform domain filtering is enabled for the current block, video encoder 200 may encode a bitstream for the video data. In this example, the bitstream includes syntax elements indicating the prediction information, the residual block, and transform domain filtering information that indicates transform domain filtering is enabled for the current block. Furthermore, in this example, video encoder 200 may perform transform domain filtering on the reconstructed block to generate a filtered block.

In some examples, video decoder 300 may determine whether the transform domain filtering information, which may be decoded from values of one or more syntax elements, indicates that transform domain filtering is attenuated for the current block. In this example, video decoder 300 may filter the spectrum components of the reconstructed pixels based on whether the transform domain filtering information indicates that transform domain filtering is attenuated for the current block. For instance, video decoder 300 may use a first look-up table for filtering in transform domain filtering when transform domain filtering is enabled and a second look-up table for filtering in transform domain filtering when transform domain filtering is attenuated that results in less comparting of coefficients than the first look-up table. Similarly, video encoder 200 may be configured to encode a bitstream to include the one or more syntax elements that signal transform domain filtering to indicate whether the transform domain filtering is attenuated for the current block or enabled for the current block and filtering the spectrum components of the reconstructed pixels based on whether the transform domain filtering information indicates that transform domain filtering is attenuated for the current block.

Techniques described herein for control of transform-based filtering using values of the syntax elements signaled in the bitstream to indicate whether transform based filtering enabled/disabled/attenuated, may improve a quality of data decoded by video decoder 300, which may improve a prediction of video data by video encoder 200 and/or video decoder 300 compared to systems that do not signal transform based filtering values. Accordingly, techniques described herein may improve a performance of video encoder 200 and/or video decoder 300, which may result in one or more of a higher computational efficiency, a smaller bitstream, and/or a lower power consumption compared to systems that do not signal transform-based filtering values.

Figure 9:
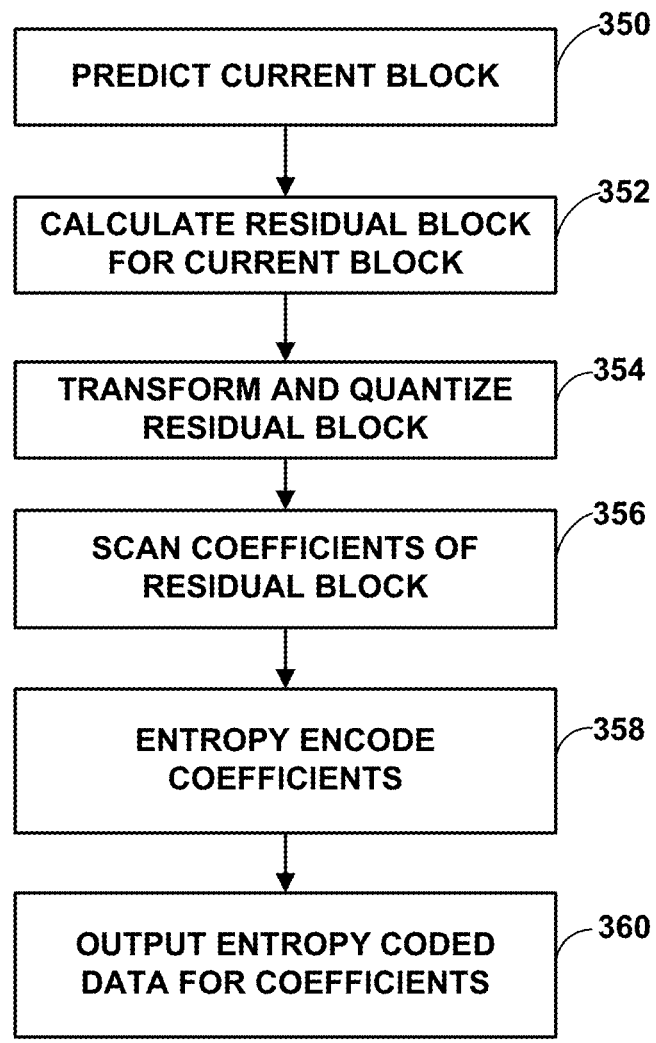
FIG. 9 is a flowchart illustrating an example method for encoding a current block.

FIG. 9 is a flowchart illustrating an example method for encoding a current block. The current block may comprise a current CU. Although described with respect to video encoder 200 (FIGS. 1 and 2), it should be understood that other devices may be configured to perform a method similar to that of FIG. 9.

In this example, video encoder 200 initially predicts the current block (350). For example, video encoder 200 may form a prediction block for the current block. In some examples, video encoder 200 determines the prediction block based on a previous block stored in decoded picture buffer 218 that has been filtered by filter unit 216, for example, using transform domain filtering. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC to include one or more syntax values indicating whether transform domain filtering is enabled, disabled, or attenuated for a current block. Video encoder 200 may then output the entropy coded data of the block (360).

Figure 10:
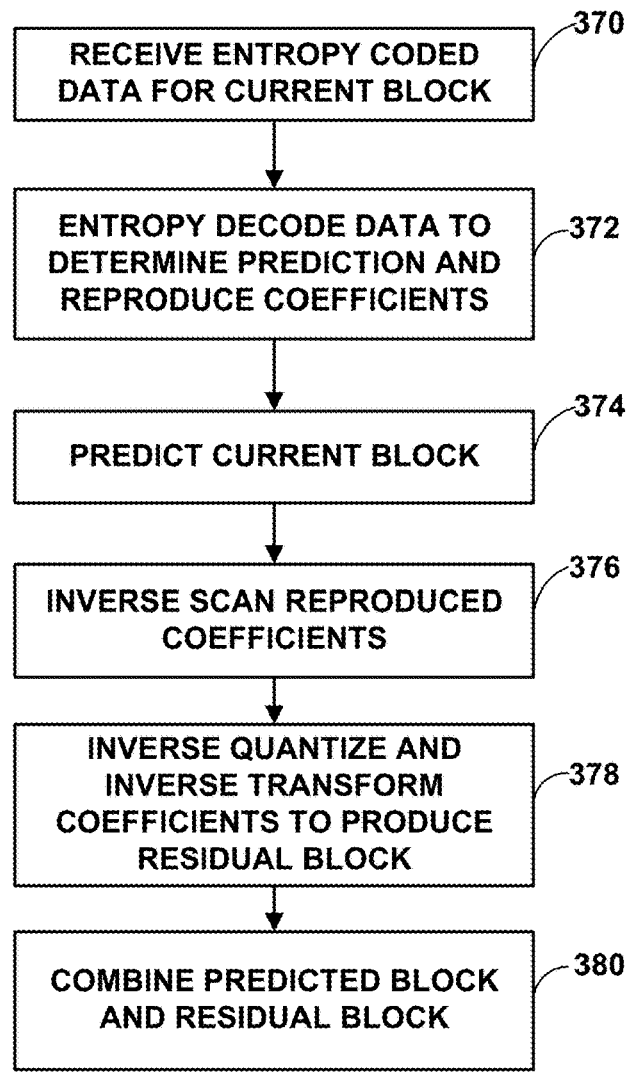
FIG. 10 a flowchart illustrating an example method for decoding a current block.

FIG. 10 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 10.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). In some examples, video decoder 300 may entropy decode entropy coded data to determine transform domain filtering information.

Video decoder 300 may predict the current block (374), e.g., using an intra- or inter-prediction mode as indicated by the prediction information for the current block, to calculate a prediction block for the current block. In some examples, video decoder 300 determines the prediction block based on a previous block stored in decoded picture buffer 314 that has been filtered by filter unit 312, for example, using transform domain filtering. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380). Video decoder 300 may reconstruct the current block using the prediction information and the residual block and apply transform domain filtering based on whether the transform domain filtering information indicates transform domain filtering is enabled, disabled, or attenuated for a current block.

Figure 11:
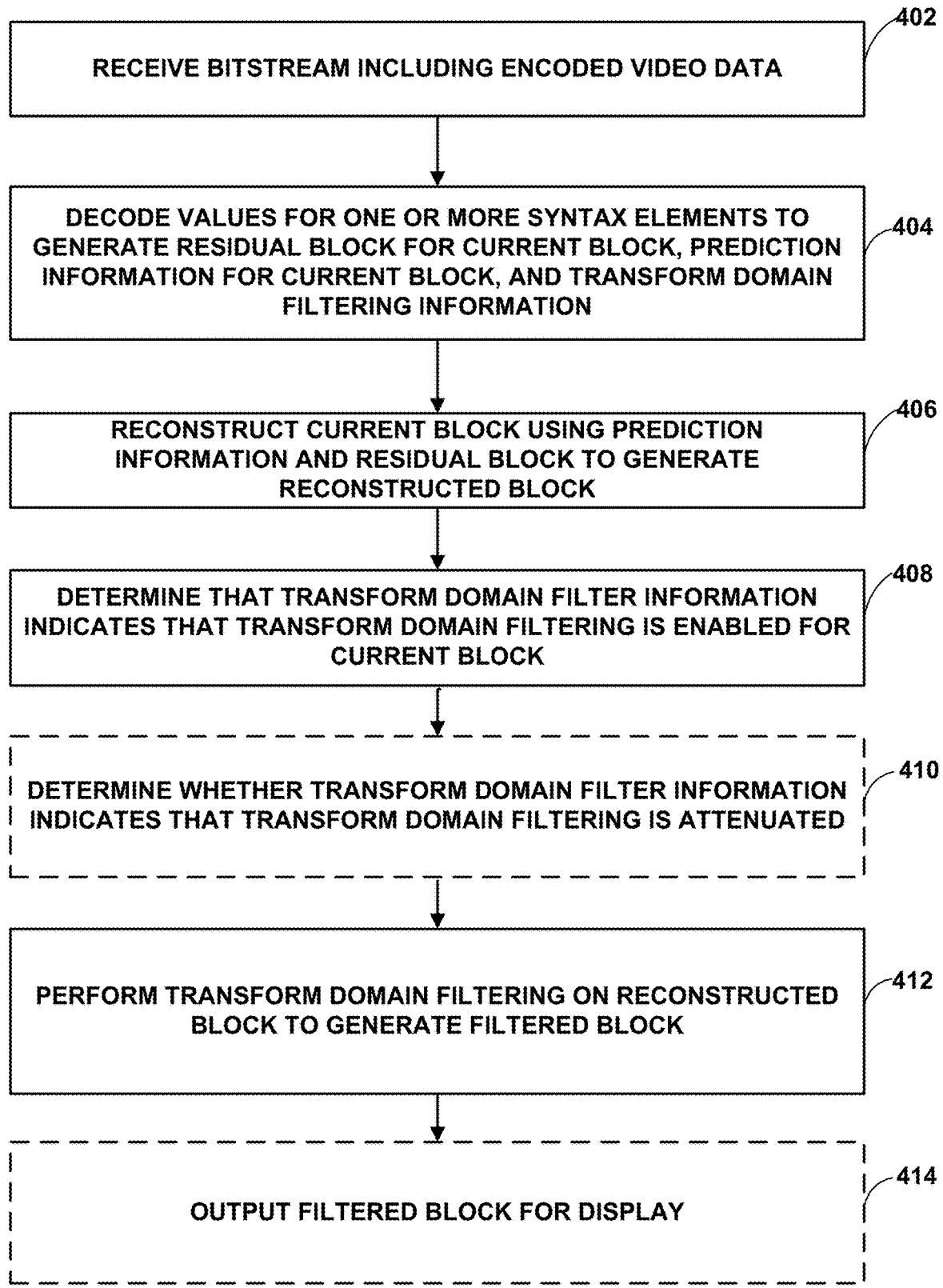
FIG. 11 a flowchart illustrating an example method for decoding transform domain filtering information.

FIG. 11 a flowchart illustrating an example method for decoding transform domain filtering information. The current block may comprise a current CU. Although described with respect to video decoder 300 (FIGS. 1 and 3), it should be understood that other devices may be configured to perform a method similar to that of FIG. 11.

Video decoder 300 may receive a bitstream including encoded video data (402). Video decoder 300 may decode, from the bitstream, values for one or more syntax elements to generate a residual block for a current block, prediction information for the current block, and transform domain filtering information (404). Video decoder 300 may reconstruct the current block using the prediction information and the residual block to generate a reconstructed block (406). Video decoder 300 may determine that the transform domain filtering information indicates that transform domain filtering is enabled for the current block (408). For example, video decoder 300 may determine that the transform domain filtering information indicates that transform domain filtering is enabled for the current block in response to determining that a particular flag of the transform domain filtering information and assigned to transform domain filtering is set. Video decoder 300 may optionally determine whether the transform domain filter information indicates that transform domain filtering is attenuated (410). For example, video decoder 300 may determine that the transform domain filtering information indicates that transform domain filtering is attenuated for the current block in response to determining that a particular flag of the transform domain filtering information and assigned to transform domain filtering is set. In response to determining that the transform domain filtering information indicates that transform domain filtering is enabled for the current block, video decoder 300 may perform transform domain filtering on the reconstructed block to generate a filtered block (412). For example, video decoder 300 may perform one or more steps illustrated in FIGS. 12 and/or 13. Video decoder 300 may optionally output the filtered block for display (414).

Figure 12:
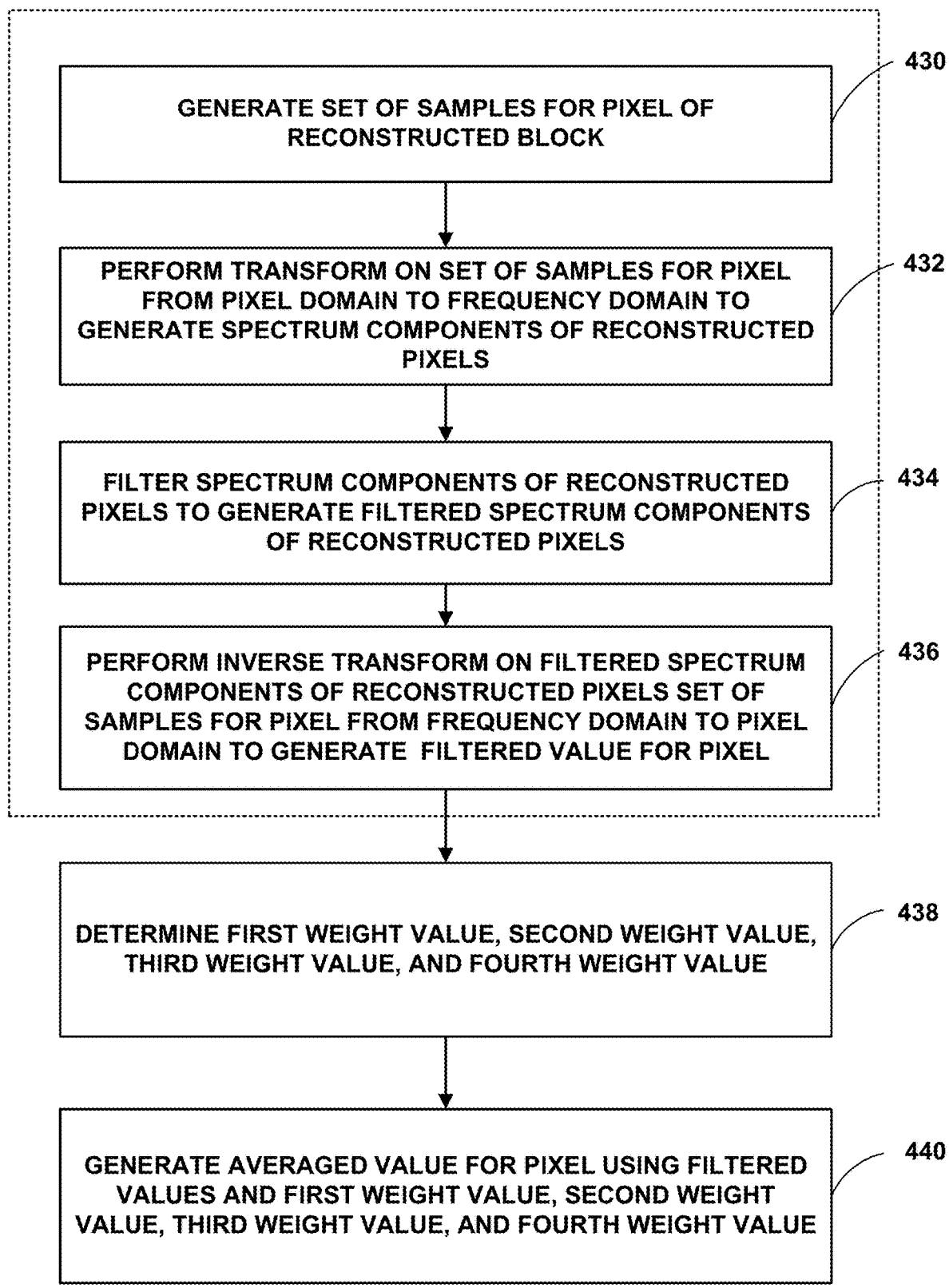
FIG. 12 a flowchart illustrating an example method for transform domain filtering.

FIG. 12 a flowchart illustrating an example method for transform domain filtering. The current block may comprise a current CU. Although described with respect to video decoder 300 (FIGS. 1 and 3), it should be understood that other devices may be configured to perform a method similar to that of FIG. 12. For example, the process described in FIG. 12 may be performed by video encoder 200 (FIGS. 1 and 4).

Video decoder 300 may, for each set of samples for a pixel of a reconstructed block, generates a set of samples for a pixel of the reconstructed block (430). For example, video decoder 300 may generate first set of samples 323, second set of samples 325, third set of samples 327, and fourth set of samples 329 of FIG. 5. Video decoder 300 may, for each set of samples for a pixel of a reconstructed block, perform a transform on the set of samples for the pixel from a pixel domain to a frequency domain to generate spectrum components of reconstructed pixels (432). For example, video decoder 300 may apply a Hadamard transform on set of samples 353 to generate spectrum components 355 of the reconstructed pixels as shown in FIG. 6.

Video decoder 300 may, for each set of samples for the pixel of a reconstructed block, filter the spectrum components of the reconstructed pixels to generate filtered spectrum components of the reconstructed pixels (434). For example, video decoder 300 may filter spectrum components using equations 1, 2, and/or 3. Video decoder 300 may, for each set of samples for the pixel of a reconstructed block, perform an inverse transform on the filtered spectrum components of the reconstructed pixels from the frequency domain to the pixel domain to generate a filtered value for the pixel (436). For example, video decoder 300 may apply an inverse Hadamard transform on filtered spectrum components 357 of the reconstructed pixels to generate filtered value 359 as shown in FIG. 6. In some examples, a filtered value is generated for each one of four sets of samples for a pixel (see FIG. 5).

Video decoder 300 may determine a first weight value, a second weight value, a third weight value, and a fourth weight value (438). For example, video decoder 300 may derive a first weight value, a second weight value, a third weight value, and a fourth weight value based on one or more of a block size for the current block, a spatial location of each sample of the first set of samples within the current block, and a coding mode for the current block. For instance, video decoder 300 may derive a first weight value having a greater value than the first weight value based on a block size for the current block.

In some examples, video decoder 300 may decode values for the one or more syntax elements to generate side information and determine a first weight value, a second weight value, a third weight value, and a fourth weight value using the side information. In some examples, video decoder 300 may simply determine each of a first weight value, a second weight value, a third weight value, and a fourth weight value have a value of 1.

Video decoder 300 may average the first weighted value, the second weighted value, the third weighted value, and the fourth weighted value to generate an averaged value for the pixel (440). For example, video decoder 300 may calculate equation 4 or equation 5.

Figure 13:
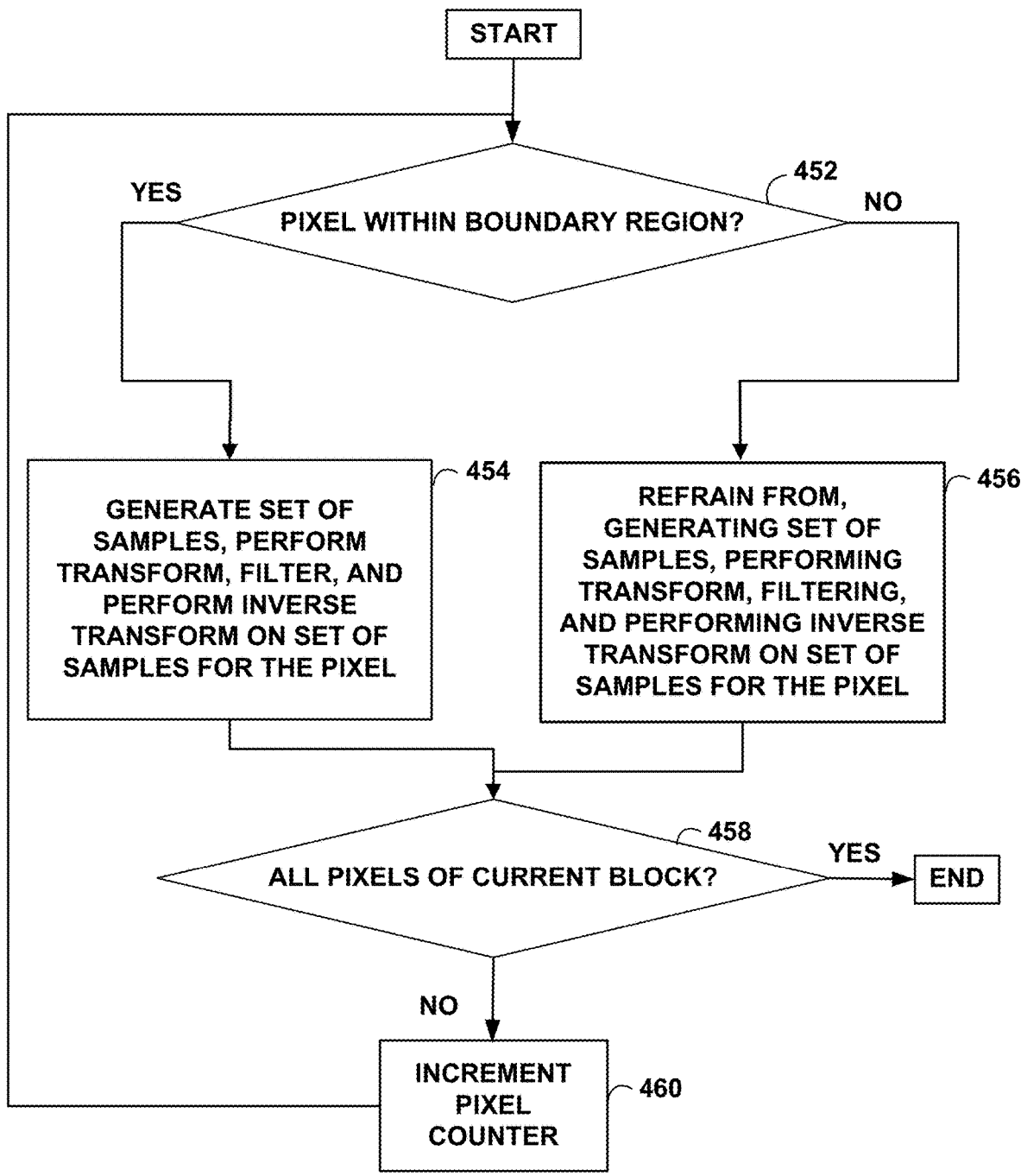
FIG. 13 a flowchart illustrating an example method for transform domain filtering using a boundary region.

FIG. 13 a flowchart illustrating an example method for transform domain filtering using a boundary region. The current block may comprise a current CU. Although described with respect to video decoder 300 (FIGS. 1 and 3), it should be understood that other devices may be configured to perform a method similar to that of FIG. 13. For example, the process described in FIG. 13 may be performed by video encoder 200 (FIGS. 1 and 4).

Video decoder 300 may determine whether a pixel is within a boundary region of the current block (452). In response to determining that the pixel is within the boundary region of the current block ("YES" of decision block 452), video decoder 300 may generate a set of samples, perform a transform (e.g., a Hadamard transform), filter, and perform an inverse transform (e.g., an inverse Hadamard transform) on a set of samples for the pixel (454). In response, however, to determining that the pixel is not within the boundary region of the current block ("NO" of decision block 452), video decoder 300 may refrain from generating a set of samples, performing a transform, filter, and performing an inverse transform on a set of samples for the pixel (456). In any case, video decoder 300 may determine if all of the pixels of the reconstructed block have been processed (458). In response to determining that all of the pixels of the reconstructed block have not been processed ("NO" of block 458), video decoder 300 increments a pixel counter (460) and the process to decision block 452. In response to determining that all of the pixels of the reconstructed block have been processed ("NO" of block 458), the process ends.

Figure 14:
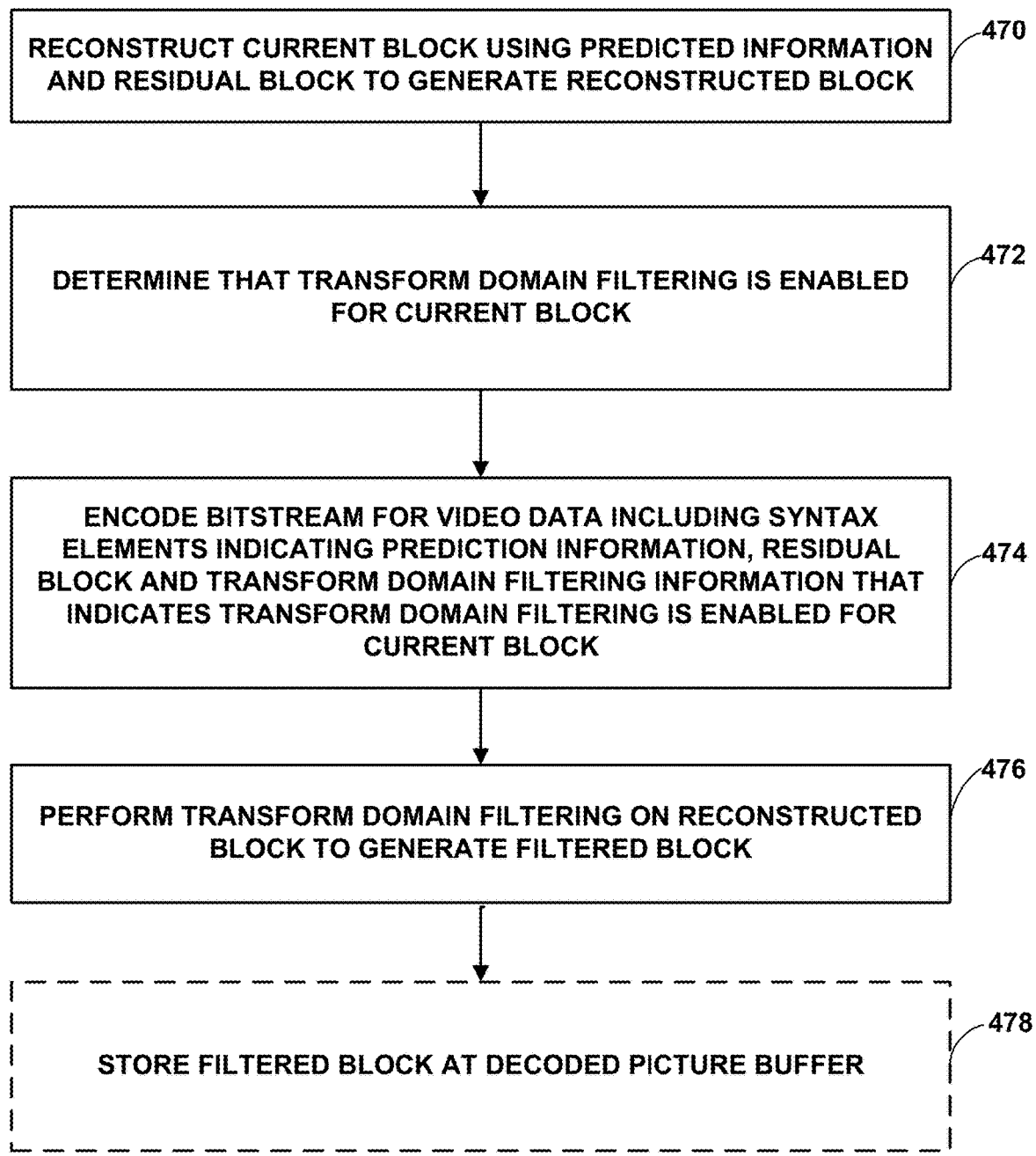
FIG. 14 a flowchart illustrating an example method for encoding transform domain filtering information.

FIG. 14 a flowchart illustrating an example method for encoding transform domain filtering information. The current block may comprise a current CU. Although described with respect to video encoder 200 (FIGS. 1 and 3), it should be understood that other devices may be configured to perform a method similar to that of FIG. 14.

Video encoder 200 may reconstruct a current block using prediction information and a residual block to generate a reconstructed block (470). Video encoder 200 may determine that transform domain filtering is enabled for the current block (472). For example, in response to determining that a current block includes artifacts or horizontal and vertical discontinuities that do not exist in an original picture, video encoder 200 may determine that transform domain filtering is enabled for the current block. In some examples, video encoder 200 may optionally determine whether transform domain filtering information indicates that transform domain filtering is attenuated for the current block. Video encoder 200 may, in response to determining that transform domain filtering is enabled for the current block: encode a bitstream for the video data, the bitstream including syntax elements indicating the prediction information, the residual block, and transform domain filtering information that indicates transform domain filtering is enabled for the current block (474) and perform transform domain filtering on the reconstructed block to generate a filtered block (476). For example, video encoder 200 may perform one or more steps illustrated in FIG. 12 and/or FIG. 13. Video encoder 200 may optionally store the filtered block at decoded picture buffer 218 (478).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or

What is claimed is:

1. A method of decoding video data, the method comprising:
receiving, by a video decoder implemented in circuitry, a bitstream including encoded video data;
decoding, by the video decoder, from the bitstream, values for one or more syntax elements to generate a residual block for a current block, prediction information for the current block, and transform domain filtering information;
reconstructing, by the video decoder, the current block using the prediction information and the residual block to generate a reconstructed block; and
in response to determining that the transform domain filtering information indicates that transform domain filtering is enabled for the current block, performing, by the video decoder, transform domain filtering on the reconstructed block to generate a filtered block, wherein performing the transform domain filtering comprises:
generating a set of samples for a pixel of the reconstructed block;
performing a transform on the set of samples for the pixel from a pixel domain to a frequency domain to generate spectrum components of reconstructed pixels;
filtering the spectrum components of the reconstructed pixels to generate filtered spectrum components of the reconstructed pixels;
wherein filtering the spectrum components comprises controlling the filtering based on whether the transform domain filtering is enabled or attenuated for the current block and using a transfer function based on a look-up table to filter the spectrum components, wherein the filtered spectrum components comprise a smaller compacting of coefficients when transform domain filtering is attenuated compared to when transform domain filtering is enabled;
wherein an output of the look-up table is based on a filtering parameter derived from a quantization parameter value associated with the current block; and
performing an inverse transform on the filtered spectrum components of the reconstructed pixels from the frequency domain to the pixel domain to generate a filtered value for the pixel.

2. The method of claim 1, wherein the set of samples is a first set of samples and the filtered value is a first filtered value and wherein performing transform domain filtering comprises:
generating a second filtered value for the pixel using a second set of samples for the pixel;
generating a third filtered value for the pixel using a third set of samples for the pixel;
generating a fourth filtered value for the pixel using a fourth set of samples for the pixel; and
averaging the first filtered value, the second filtered value, the third filtered value, and the fourth filtered value to generate an averaged value for the pixel, the method further comprising generating the filtered block to indicate the averaged value for the pixel.

3. The method of claim 1, wherein the set of samples is a first set of samples and the filtered value is a first filtered value, wherein decoding the values for the one or more syntax elements to generate the residual block for the current block comprises decoding the values for the one or more syntax elements to generate side information, wherein the method further comprises determining, by the video decoder, a first weight value, a second weight value, a third weight value, and a fourth weight value using the side information, and wherein performing transform domain filtering comprises:
generating a first weighted value for the pixel using the first weight value and the first filtered value;
generating a second weighted value for the pixel using the second weight value and a second filtered value generated using a second set of samples for the pixel;
generating a third weighted value for the pixel using the third weight value and a third filtered value generated using a third set of samples for the pixel;
generating a fourth weighted value for the pixel using the fourth weight value and a fourth filtered value generated using a fourth set of samples for the pixel; and
averaging the first weighted value, the second weighted value, the third weighted value, and the fourth weighted value to generate an averaged value for the pixel, the method further comprising generating the filtered block to indicate the averaged value for the pixel.

4. The method of claim 1, wherein the set of samples is a first set of samples and the filtered value is a first filtered value and wherein the method further comprises deriving, by the video decoder, a first weight value, a second weight value, a third weight value, and a fourth weight value based on one or more of a block size for the current block, a spatial location of each sample of the first set of samples within the current block, and a coding mode for the current block, wherein performing transform domain filtering comprises:
generating a first weighted value for the pixel using the first weight value and the first filtered value;
generating a second weighted value for the pixel using the second weight value and a second filtered value generated using a second set of samples for the pixel;
generating a third weighted value for the pixel using the third weight value and a third filtered value generated using a third set of samples for the pixel;
generating a fourth weighted value for the pixel using the fourth weight value and a fourth filtered value generated using a fourth set of samples for the pixel; and
averaging the first weighted value, the second weighted value, the third weighted value, and the fourth weighted value to generate an averaged value for the pixel, the method further comprising generating the filtered block to indicate the averaged value for the pixel.

5. The method of claim 1, wherein the set of samples is a first set of samples arranged within a 2×2 window positioned for a top-left group of samples that includes the pixel, wherein the filtered value is a first filtered value, and wherein performing transform domain filtering comprises:
generating a second filtered value for the pixel using a second set of samples arranged within the 2×2 window positioned for a top-right group of samples that includes the pixel;
generating a third filtered value for the pixel using a third set of samples arranged within the 2×2 window positioned for a bottom-left group of samples that includes the pixel; and
generating a fourth filtered value for the pixel using a fourth set of samples arranged within the 2×2 window positioned for a bottom-right group of samples that includes the pixel.

6. The method of claim 1, wherein the spectrum components of the reconstructed pixels are first spectrum components of the reconstructed pixels and the filtered spectrum components of the reconstructed pixels are first filtered spectrum components of the reconstructed pixels and wherein performing transform domain filtering comprises:
  generating a second set of samples for the pixel;
  performing the transform on the second set of samples for the pixel from the pixel domain to the frequency domain to generate second spectrum components of the reconstructed pixels;
  filtering the second spectrum components of the reconstructed pixels to generate second filtered spectrum components of the reconstructed pixels; and
  performing the inverse transform on the second filtered spectrum components of the reconstructed pixels from the frequency domain to the pixel domain to generate a second filtered value for the pixel.

7. The method of claim 1,
  wherein performing the transform comprises performing a Hadamard transform; and
  wherein performing the inverse transform comprises performing an inverse Hadamard transform.

8. The method of claim 1, wherein performing transform domain filtering comprises:
  determining whether the pixel is within a boundary region of the current block, wherein generating the set of samples, performing the transform, filtering, and performing the inverse transform are in response to determining that the pixel is within the boundary region of the current block.

9. The method of claim 8, wherein the pixel is a first pixel and wherein performing transform domain filtering comprises:
  determining whether a second pixel is within the boundary region of the current block; and
  in response to determining that the second pixel is not within the boundary region of the current block, refraining from performing transform domain filtering on the second pixel.

10. An apparatus for decoding video data, the apparatus comprising:
  memory configured to store encoded video data; and
  one or more processors implemented in circuitry and configured to:
    receive a bitstream including the encoded video data;
    decode, from the bitstream, values for one or more syntax elements to generate a residual block for a current block, prediction information for the current block, and transform domain filtering information;
    reconstruct the current block using the prediction information and the residual block to generate a reconstructed block; and
    in response to determining that the transform domain filtering information indicates that transform domain filtering is enabled for the current block, perform transform domain filtering on the reconstructed block to generate a filtered block, wherein, to perform the transform domain filtering, the one or more processors are configured to:
      generate a set of samples for a pixel of the reconstructed block;
      perform a transform on the set of samples for the pixel from a pixel domain to a frequency domain to generate spectrum components of reconstructed pixels;
      filter the spectrum components of the reconstructed pixels to generate filtered spectrum components of the reconstructed pixels;
      wherein, to filter the spectrum components, the one or more processors are configured to control the filtering based on whether the transform domain filtering is enabled or attenuated for the current block and use a transfer function based on a look-up table to filter the spectrum components, wherein the filtered spectrum components comprise a smaller compacting of coefficients when transform domain filtering is attenuated compared to when transform domain filtering is enabled;
      wherein an output of the look-up table is based on a filtering parameter derived from a quantization parameter value associated with the current block; and
      perform an inverse transform on the filtered spectrum components of the reconstructed pixels from the frequency domain to the pixel domain to generate a filtered value for the pixel.

11. The apparatus of claim 10, wherein the set of samples is a first set of samples and the filtered value is a first filtered value and wherein, to perform transform domain filtering, the one or more processors are configured to:
  generate a second filtered value for the pixel using a second set of samples for the pixel;
  generate a third filtered value for the pixel using a third set of samples for the pixel;
  generate a fourth filtered value for the pixel using a fourth set of samples for the pixel; and
  average the first filtered value, the second filtered value, the third filtered value, and the fourth filtered value to generate an averaged value for the pixel, the method further comprising generating the filtered block to indicate the averaged value for the pixel.

12. The apparatus of claim 10, wherein the set of samples is a first set of samples and the filtered value is a first filtered value, wherein, to decode the values for the one or more syntax elements to generate the residual block for the current block, the one or more processors are configured to decode the values for the one or more syntax elements to generate side information, wherein the one or more processors are configure to determine a first weight value, a second weight value, a third weight value, and a fourth weight value using the side information, and wherein, to perform transform domain filtering, the one or more processors are configured to:
  generate a first weighted value for the pixel using the first weight value and the first filtered value;
  generate a second weighted value for the pixel using the second weight value and a second filtered value generated using a second set of samples for the pixel;
  generating a third weighted value for the pixel using the third weight value and a third filtered value generated using a third set of samples for the pixel;
  generate a fourth weighted value for the pixel using the fourth weight value and a fourth filtered value generated using a fourth set of samples for the pixel;
  average the first weighted value, the second weighted value, the third weighted value, and the fourth weighted value to generate an averaged value for the pixel, wherein the one or more processors are configured to generate the filtered block to indicate the averaged value for the pixel.

13. The apparatus of claim 10, wherein the set of samples is a first set of samples and the filtered value is a first filtered value and wherein the one or more processors are configured to derive a first weight value, a second weight value, a third weight value, and a fourth weight value based on one or more of a block size for the current block, a spatial location of each sample of the first set of samples within the current block, and a coding mode for the current block, wherein, to perform transform domain filtering, the one or more processors are configured to:
- generate a first weighted value for the pixel using the first weight value and the first filtered value;
- generate a second weighted value for the pixel using the second weight value and a second filtered value generated using a second set of samples for the pixel;
- generate a third weighted value for the pixel using the third weight value and a third filtered value generated using a third set of samples for the pixel;
- generate a fourth weighted value for the pixel using the fourth weight value and a fourth filtered value generated using a fourth set of samples for the pixel; and
- average the first weighted value, the second weighted value, the third weighted value, and the fourth weighted value to generate an averaged value for the pixel, wherein the one or more processors are configured to generate the filtered block to indicate the averaged value for the pixel.

14. The apparatus of claim 10, wherein the set of samples is a first set of samples arranged within a 2×2 window positioned for a top-left group of samples that includes the pixel, wherein the filtered value is a first filtered value, and wherein, to perform transform domain filtering, the one or more processors are configured to:
- generate a second filtered value for the pixel using a second set of samples arranged within the 2×2 window positioned for a top-right group of samples that includes the pixel;
- generate a third filtered value for the pixel using a third set of samples arranged within the 2×2 window positioned for a bottom-left group of samples that includes the pixel; and
- generate a fourth filtered value for the pixel using a fourth set of samples arranged within the 2×2 window positioned for a bottom-right group of samples that includes the pixel.

15. The apparatus of claim 10, wherein the spectrum components of the reconstructed pixels are first spectrum components of the reconstructed pixels and the filtered spectrum components of the reconstructed pixels are first filtered spectrum components of the reconstructed pixels and wherein, to perform transform domain filtering, the one or more processors are configured to:
- generate a second set of samples for the pixel;
- perform the transform on the second set of samples for the pixel from the pixel domain to the frequency domain to generate second spectrum components of the reconstructed pixels;
- filter the second spectrum components of the reconstructed pixels to generate second filtered spectrum components of the reconstructed pixels; and
- perform the inverse transform on the second filtered spectrum components of the reconstructed pixels from the frequency domain to the pixel domain to generate a second filtered value for the pixel.

16. The apparatus of claim 10, wherein, to perform the transform, the one or more processors are configured to perform a Hadamard transform; and wherein, to perform the inverse transform, the one or more processors are configured to perform an inverse Hadamard transform.

17. The apparatus of claim 10, wherein, to perform transform domain filtering, the one or more processors are configured to:
- determine whether the pixel is within a boundary region of the current block, wherein the one or more processors are configured to generate the set of samples, perform the transform, filter, and perform the inverse transform in response to determining that the pixel is within the boundary region of the current block.

18. The apparatus of claim 17, wherein the pixel is a first pixel and wherein, to perform transform domain filtering, the one or more processors are configured to:
- determine whether a second pixel is within the boundary region of the current block; and
- in response to determining that the second pixel is not within the boundary region of the current block, refrain from performing transform domain filtering on the second pixel.

19. An apparatus for decoding video data, the apparatus comprising:
- means for receiving a bitstream including encoded video data;
- means for decoding, from the bitstream, values for one or more syntax elements to generate a residual block for a current block, prediction information for the current block, and transform domain filtering information;
- means for reconstructing the current block using the prediction information and the residual block to generate a reconstructed block; and
- means for performing transform domain filtering on the reconstructed block to generate a filtered block in response to determining that the transform domain filtering information indicates that transform domain filtering is enabled for the current block, wherein the means for performing the transform domain filtering comprises:
  - means for generating a set of samples for a pixel of the reconstructed block;
  - means for performing a transform on the set of samples for the pixel from a pixel domain to a frequency domain to generate spectrum components of reconstructed pixels;
  - means for filtering the spectrum components of the reconstructed pixels to generate filtered spectrum components of the reconstructed pixels;
  - wherein the means for filtering the spectrum components comprises means for controlling the filtering based on whether the transform domain filtering is enabled or attenuated for the current block and means for using a transfer function based on a look-up table to filter the spectrum components, wherein the filtered spectrum components comprise a smaller compacting of coefficients when transform domain filtering is attenuated compared to when transform domain filtering is enabled;
  - wherein an output of the look-up table is based on a filtering parameter derived from a quantization parameter value associated with the current block; and
  - means for performing an inverse transform on the filtered spectrum components of the reconstructed pixels from the frequency domain to the pixel domain to generate a filtered value for the pixel.

20. A non-transitory computer-readable storage medium storing instructions that, when executed cause one or more processors to:
- receive a bitstream including encoded video data;
- decode, from the bitstream, values for one or more syntax elements to generate a residual block for a current block, prediction information for the current block, and transform domain filtering information;
- reconstruct the current block using the prediction information and the residual block to generate a reconstructed block; and
- in response to determining that the transform domain filtering information indicates that transform domain filtering is enabled for the current block, perform transform domain filtering on the reconstructed block to generate a filtered block, wherein, to perform the transform domain filtering, the instructions further cause the one or more processors to:
  - generate a set of samples for a pixel of the reconstructed block;
  - perform a transform on the set of samples for the pixel from a pixel domain to a frequency domain to generate spectrum components of reconstructed pixels;
  - filter the spectrum components of the reconstructed pixels to generate filtered spectrum components of the reconstructed pixels;
  - wherein, to filter the spectrum components, the instructions further cause the one or more processors to control the filtering based on whether the transform domain filtering is enabled or attenuated for the current block and to use a transfer function based on a look-up table to filter the spectrum components, wherein the filtered spectrum components comprise a smaller compacting of coefficients when transform domain filtering is attenuated compared to when transform domain filtering is enabled;
  - wherein an output of the look-up table is based on a filtering parameter derived from a quantization parameter value associated with the current block; and
  - perform an inverse transform on the filtered spectrum components of the reconstructed pixels from the frequency domain to the pixel domain to generate a filtered value for the pixel.

21. A method of encoding video data, the method comprising:
- reconstructing, by a video encoder implemented in circuitry, a current block using prediction information and a residual block to generate a reconstructed block;
- in response to determining that transform domain filtering is enabled for the current block:
  - encoding, by the video encoder, a bitstream for the video data, the bitstream including one or more syntax elements indicating the prediction information, the residual block, and transform domain filtering information that indicates transform domain filtering is enabled for the current block; and
  - performing, by the video encoder, transform domain filtering on the reconstructed block to generate a filtered block, wherein performing the transform domain filtering comprises:
    - generating a set of samples for a pixel of the reconstructed block;
    - performing a transform on the set of samples for the pixel from a pixel domain to a frequency domain to generate spectrum components of reconstructed pixels;
    - filtering the spectrum components of the reconstructed pixels to generate filtered spectrum components of the reconstructed pixels;
    - wherein filtering the spectrum components comprises controlling the filtering based on whether the transform domain filtering is enabled or attenuated for the current block and using a transfer function based on a look-up table to filter the spectrum components, wherein the filtered spectrum components comprise a smaller compacting of coefficients when transform domain filtering is attenuated compared to when transform domain filtering is enabled;
    - wherein an output of the look-up table is based on a filtering parameter derived from a quantization parameter value associated with the current block; and
    - performing an inverse transform on the filtered spectrum components of the reconstructed pixels from the frequency domain to the pixel domain to generate a filtered value for the pixel.

22. The method of claim 21, wherein encoding comprises encoding the bitstream to include the one or more syntax elements that signal the transform domain filtering information to indicate whether the transform domain filtering is attenuated for the current block or enabled for the current block.

23. The method of claim 21, wherein the set of samples is a first set of samples and the filtered value is a first filtered value and wherein performing transform domain filtering comprises:
- generating a second filtered value for the pixel using a second set of samples for the pixel;
- generating a third filtered value for the pixel using a third set of samples for the pixel;
- generating a fourth filtered value for the pixel using a fourth set of samples for the pixel; and
- averaging the first filtered value, the second filtered value, the third filtered value, and the fourth filtered value to generate an averaged value for the pixel, the method further comprising generating the filtered block to indicate the averaged value for the pixel.

24. The method of claim 21, wherein the set of samples is a first set of samples and the filtered value is a first filtered value, wherein encoding comprises encoding the one or more syntax elements to generate side information indicating a first weight value, a second weight value, a third weight value, and a fourth weight value, and wherein performing transform domain filtering comprises:
- generating a first weighted value for the pixel using the first weight value and the first filtered value;
- generating a second weighted value for the pixel using the second weight value and a second filtered value generated using a second set of samples for the pixel;
- generating a third weighted value for the pixel using the third weight value and a third filtered value generated using a third set of samples for the pixel;
- generating a fourth weighted value for the pixel using the fourth weight value and a fourth filtered value generated using a fourth set of samples for the pixel;
- averaging the first weighted value, the second weighted value, the third weighted value, and the fourth weighted value to generate an averaged value for the pixel, the method further comprising generating the filtered block to indicate the averaged value for the pixel.

25. The method of claim 21, wherein the set of samples is a first set of samples and the filtered value is a first filtered value and wherein the method further comprises deriving, by the video encoder, a first weight value, a second weight value, a third weight value, and a fourth weight value based on one or more of a block size for the current block, a spatial location of each sample of the first set of samples within the current block, and a coding mode for the current block, wherein performing transform domain filtering comprises:
   generating a first weighted value for the pixel using the first weight value and the first filtered value;
   generating a second weighted value for the pixel using the second weight value and a second filtered value generated using a second set of samples for the pixel;
   generating a third weighted value for the pixel using the third weight value and a third filtered value generated using a third set of samples for the pixel;
   generating a fourth weighted value for the pixel using the fourth weight value and a fourth filtered value generated using a fourth set of samples for the pixel; and
   averaging the first weighted value, the second weighted value, the third weighted value, and the fourth weighted value to generate an averaged value for the pixel, the method further comprising generating the filtered block to indicate the averaged value for the pixel.

26. The method of claim 21, wherein the set of samples is a first set of samples arranged within a 2×2 window positioned for a top-left group of samples that includes the pixel, wherein the filtered value is a first filtered value, and wherein performing transform domain filtering comprises:
   generating a second filtered value for the pixel using a second set of samples arranged within the 2×2 window positioned for a top-right group of samples that includes the pixel;
   generating a third filtered value for the pixel using a third set of samples arranged within the 2×2 window positioned for a bottom-left group of samples that includes the pixel;
   generating a fourth filtered value for the pixel using a fourth set of samples arranged within the 2×2 window positioned for a bottom-right group of samples that includes the pixel.

27. The method of claim 21, wherein the spectrum components of the reconstructed pixels are first spectrum components of the reconstructed pixels and the filtered spectrum components of the reconstructed pixels are first filtered spectrum components of the reconstructed pixels and wherein performing transform domain filtering comprises:
   generating a second set of samples for the pixel;
   performing the transform on the second set of samples for the pixel from the pixel domain to the frequency domain to generate a second spectrum components of the reconstructed pixels;
   filtering the second spectrum components of the reconstructed pixels to generate second filtered spectrum components of the reconstructed pixels; and
   performing the inverse transform on the second filtered spectrum components of the reconstructed pixels from the frequency domain to the pixel domain to generate a second filtered value for the pixel.

28. The method of claim 21,
   wherein performing the transform comprises performing a Hadamard transform; and
   wherein performing the inverse transform comprises performing an inverse Hadamard transform.

29. The method of claim 21, wherein performing transform domain filtering comprises:
   determining whether the pixel is within a boundary region of the current block, wherein generating the samples, performing the transform, filtering, and performing the inverse transform are in response to determining that the pixel is within the boundary region of the current block.

30. An apparatus for encoding video data, the apparatus comprising:
   memory configured to store the video data; and
   one or more processors implemented in circuitry and configured to:
      reconstruct a current block using prediction information and a residual block to generate a reconstructed block;
      in response to determining that transform domain filtering is enabled for the current block:
         encode a bitstream for the video data, the bitstream including one or more syntax elements indicating the prediction information, the residual block, and transform domain filtering information that indicates transform domain filtering is enabled for the current block; and
         perform transform domain filtering on the reconstructed block to generate a filtered block, wherein, to perform the transform domain filtering, the one or more processors are configured to:
            generate a set of samples for a pixel of the reconstructed block;
            perform a transform on the set of samples for the pixel from a pixel domain to a frequency domain to generate spectrum components of reconstructed pixels;
            filter the spectrum components of the reconstructed pixels to generate filtered spectrum components of the reconstructed pixels;
            wherein, to filter the spectrum components, the one or more processors are configured to control the filtering based on whether the transform domain filtering is enabled or attenuated for the current block and use a transfer function based on a look-up table to filter the spectrum components, wherein the filtered spectrum components comprise a smaller compacting of coefficients when transform domain filtering is attenuated compared to when transform domain filtering is enabled;
            wherein an output of the look-up table is based on a filtering parameter derived from a quantization parameter value associated with the current block; and
            perform an inverse transform on the filtered spectrum components of the reconstructed pixels from the frequency domain to the pixel domain to generate a filtered value for the pixel.

* * * * *